United States Patent
Behera

(10) Patent No.: US 10,165,531 B1
(45) Date of Patent: Dec. 25, 2018

(54) TRANSMISSION AND RECEPTION OF SIGNALS IN A TIME SYNCHRONIZED WIRELESS SENSOR ACTUATOR NETWORK

(71) Applicant: Spearlx Technologies, Inc., Cedar Park, TX (US)

(72) Inventor: Manas Behera, Cedar Park, TX (US)

(73) Assignee: Spearlx Technologies, Inc., Cedar Park, TX (US)

(*) Notice: Subject to any disclaimer, the term of this patent is extended or adjusted under 35 U.S.C. 154(b) by 211 days.

(21) Appl. No.: 15/380,010

(22) Filed: Dec. 15, 2016

Related U.S. Application Data

(60) Provisional application No. 62/268,927, filed on Dec. 17, 2015.

(51) Int. Cl.
*H04J 3/06* (2006.01)
*H04W 56/00* (2009.01)
*H04W 72/04* (2009.01)
*H04W 4/70* (2018.01)

(52) U.S. Cl.
CPC .......... *H04W 56/001* (2013.01); *H04W 4/70* (2018.02); *H04W 72/0446* (2013.01)

(58) Field of Classification Search
None
See application file for complete search history.

(56) References Cited

U.S. PATENT DOCUMENTS

| | | | |
|---|---|---|---|
| 7,091,854 B1 | 8/2006 | Miao | |
| 8,634,434 B2 | 1/2014 | Heidari et al. | |
| 8,804,644 B2 | 8/2014 | Cordeiro et al. | |
| 9,226,171 B2 * | 12/2015 | Safavi | H04W 24/02 |
| 2005/0094585 A1 * | 5/2005 | Golden | H04B 7/0408 370/310 |
| 2005/0151634 A1 * | 7/2005 | Tsuji | B60C 23/0413 340/445 |
| 2007/0053295 A1 | 3/2007 | Cleveland et al. | |
| 2007/0153760 A1 * | 7/2007 | Shapira | H04B 7/2681 370/350 |

(Continued)

OTHER PUBLICATIONS

"Components of WirelessHART technology", WirelessHART Technology, Hart Communication Foundation, retrieved from the internet on Dec. 15, 2016: URL: http://en.hartcomm.org/hcp/tech/wihart/wireless_components.html, 1 page.

(Continued)

*Primary Examiner* — Otis L Thompson, Jr.

(57) ABSTRACT

In a wireless sensor actuator network, a time slot for transmission of a signal to a first device and a second device of the wireless sensor actuator network may be determined. During the time slot, the signal may be transmitted via a first frequency channel and first antenna to the first device and via a second frequency channel and second antenna to the second device in parallel. The first frequency channel may be different from the second frequency channel. Further, the first frequency channel and the second frequency channel may be selected based on a power level to transmit the signal to the first device, a power level to transmit the signal to the second device, an angle to transmit the signal to the first device, and an angle to transmit the signal to the second device.

20 Claims, 29 Drawing Sheets

(56) References Cited

U.S. PATENT DOCUMENTS

| | | | | |
|---|---|---|---|---|
| 2007/0268846 A1* | 11/2007 | Proctor, Jr. | ........ | H04B 7/15535 370/279 |
| 2008/0036645 A1* | 2/2008 | Yamano | ................ | G01S 7/023 342/109 |
| 2009/0023458 A1* | 1/2009 | Mountney | ............ | H04W 16/14 455/456.1 |
| 2009/0106810 A1* | 4/2009 | Stoye | .................... | H04L 5/0041 725/131 |
| 2010/0027489 A1* | 2/2010 | Matsuzawa | ........... | H04W 16/12 370/329 |
| 2010/0067362 A1 | 3/2010 | Sakaguchi et al. | | |
| 2010/0246542 A1 | 9/2010 | Orth | | |
| 2011/0158156 A1* | 6/2011 | Ma | .................... | H04B 7/15542 370/315 |
| 2011/0199983 A1* | 8/2011 | Hasan Mahmoud | ........................ | H04W 52/267 370/329 |
| 2011/0235684 A1* | 9/2011 | Dahlman | ................. | H04B 1/59 375/135 |
| 2012/0235499 A1* | 9/2012 | Liu | ........................ | H02J 17/00 307/104 |
| 2013/0141221 A1* | 6/2013 | Oksanen | ................ | A61H 3/061 340/10.5 |
| 2013/0295944 A1* | 11/2013 | Saur | ...................... | H04W 16/28 455/450 |
| 2014/0362729 A1* | 12/2014 | Michaud | ............... | H04W 16/26 370/254 |
| 2015/0156671 A1* | 6/2015 | Kuchibhotla | ......... | H04L 1/1861 370/330 |
| 2015/0288451 A1* | 10/2015 | Mazariegos | ....... | H04B 10/2507 398/147 |
| 2016/0013881 A1* | 1/2016 | Rejaly | ................. | H04J 14/0224 398/69 |
| 2016/0072578 A1* | 3/2016 | Jin | ......................... | H04J 14/086 398/36 |
| 2016/0118038 A1* | 4/2016 | Eaton | ..................... | G10K 15/08 381/63 |
| 2017/0055281 A1* | 2/2017 | Islam | ................. | H04W 72/0446 |
| 2017/0347340 A1* | 11/2017 | Haley | .................. | H04L 25/0204 |
| 2018/0069615 A1* | 3/2018 | Ma | ........................ | H04B 7/0697 |
| 2018/0109146 A1* | 4/2018 | Meng | ...................... | H02J 50/12 |

OTHER PUBLICATIONS

"WirelessHART—How it works", WirelessHART Technology, Hart Communication Foundation, retrieved from the internet on Dec. 15, 2016: URL: http://en.hartcomm.org/hcp/tech/wihart/wireless_how_it_works.html, 1 page.

"WirelessHart Overview", WirelessHART Technology, HART Communication Foundation, retrieved from the internet on Dec. 15, 2016: URL: http://en.hartcomm.org/hcp/tech/wihart/wireless_overview.html, 2 pages.

* cited by examiner

FIG. 12a

|  | TIME SLOT1 | TIME SLOT2 | TIME SLOT3 | TIME SLOT4 |
|---|---|---|---|---|
| FREQUENCY CHANNEL 1 | A => B<br>numRX=2<br>numTX=1 | | | |
| FREQUENCY CHANNEL 2 | | E=>G<br>numRX=2<br>numTX=1 | E=>G<br>numRX=2<br>numTX=1 | |
| FREQUENCY CHANNEL 3 | A => C<br>numRX=2<br>numTX=1 | | | |
| FREQUENCY CHANNEL 4 | | C=>G<br>numRX=2<br>numTX=1 | C=>G<br>numRX=2<br>numTX=1 | |
| FREQUENCY CHANNEL 5 | A => E<br>numRX=1<br>numTX=1 | | | |
| FREQUENCY CHANNEL 6 | A => E<br>numRX=1<br>numTX=1 | B=>D<br>numRX=2<br>numTX=1 | | D=>G<br>numRX=4<br>numTX=1 |

FIG. 12b

| TIME SLOT | FREQUENCY CHANNEL | DEVICE ADDRESS | LINK TYPE | NUM RX | NUM TX |
|---|---|---|---|---|---|
| 1 | 1 | A | TRANSMIT |  | 1 |
| 1 | 3 | A | TRANSMIT |  | 1 |
| 1 | 5 | A | TRANSMIT |  | 1 |
| 1 | 6 | A | TRANSMIT |  | 1 |
| 1 | 1 | B | RECEIVE | 2 |  |
| 2 | 6 | B | TRANSMIT |  | 1 |
| 1 | 3 | C | RECEIVE | 2 |  |
| 2 | 4 | C | TRANSMIT |  | 1 |
| 3 | 4 | C | TRANSMIT |  | 1 |
| 2 | 6 | D | RECEIVE | 2 |  |
| 4 | 6 | D | TRANSMIT |  | 1 |
| 1 | 5 | E | RECEIVE | 1 |  |
| 1 | 6 | E | RECEIVE | 1 |  |
| 2 | 2 | E | TRANSMIT |  | 1 |
| 3 | 2 | E | TRANSMIT |  | 1 |
| 2 | 2 | G | RECEIVE | 2 |  |
| 2 | 4 | G | RECEIVE | 2 |  |
| 3 | 2 | G | RECEIVE | 2 |  |
| 3 | 4 | G | RECEIVE | 2 |  |
| 4 | 6 | G | RECEIVE | 4 |  |

TRANSMISSION AND RECEPTION OF SIGNALS IN A TIME SYNCHRONIZED WIRELESS SENSOR ACTUATOR NETWORK

RELATED APPLICATION

This disclosure claims priority to U.S. Provisional Application Ser. No. 62/268,927 entitled "Transmission and Reception Schemes for Communication Networks" filed on Dec. 17, 2015, the contents of which are hereby incorporated by reference in its entirety.

FIELD OF THE DISCLOSURE

This disclosure relates to wireless networks and particularly to transmission and reception of signals in a time synchronized wireless sensor actuator network.

BACKGROUND

Modern industrial systems often rely on automated monitoring and control of industrial assets. The industrial assets include transportation machines (e.g., locomotives and aircraft), industrial equipment (e.g., factory machinery, mining equipment), and/or utility machines (e.g., turbines and solar farms). The industrial assets are monitored and control led via a wireless sensor actuator network (WSAN). The WSAN comprises various networked devices including sensors, actuators, routers, and gateways. Sensors monitor operational parameters of the assets. The operational parameters include temperature, pressure, flow, vibration, etc. The sensors can be positioned to collect the operational parameters and send corresponding signals to the gateway, via the routers. The gateway may receive the signals from the sensors, analyze the signals and then send, via the routers, control signals to the actuators, e.g., servos or motors. The control signals sent to the actuators may cause an operating condition, e.g., a valve position or engine speed, on the industrial asset to be adjusted thereby assuring optimal system performance.

OVERVIEW

WirelessHART is a well known protocol for transmission and reception of signals over the WSAN. WirelessHART is based on the Highway Addressable Remote Transducer Protocol (HART). WirelessHART achieves wireless transmission and reception of signals over the WSAN in fixed time slots. The fixed time slot in WirelessHART is a period of time during which a signal is transmitted from a source to a destination. Multiple time slots are required to transmit signals to different destinations.

Each time slot has a fixed duration of 10 ms, which allows a device on the WSAN to transmit a signal and receive an acknowledgment. WirelessHART is attractive for industrial communications, since it is a deterministic system once each device on the WSAN is assigned a slot time to transmit.

WirelessHART defines a schedule associated with the transmission of the signals, e.g., packets, in the time slots by the devices on the WSAN. The schedule indicates on which time slot a station is to transmit a packet to a destination node. Additionally, the schedule reserves two time slots for retransmission: the first time slot is for retry to a same destination node in a next time slot if the received packet has errors at the destination node and the second time slot is to a neighbor of the destination node (if available) if the received packet sent at the first time slot still has errors at the destination node. Accordingly, at least 50% of the time slots may be allocated for retransmission in the WirelessHART protocol.

The WirelessHART protocol attempts to make latency and bandwidth expectations more predictable by reserving time slots for transmission and retransmission of packets. But the need to retransmit packets in the first place still increases latency and reduces bandwidth associated with transmission of packets over the WSAN.

Embodiments described herein are directed to a method, system, and apparatus for transmission and/or reception of signals at different frequencies in a time slot which reduces need for retransmission. The transmission of the signals at different frequencies in a time slot may introduce frequency diversity which reduce retransmissions and/or packet loss over the WSAN due to interference or multi-path propagation events. Further, latency may be reduced because signals are transmitted at a same time, e.g., in parallel over a plurality of frequencies in a time slot, rather than serially.

In one example, a sensor device may be monitoring an asset. The sensor device may generate a signal associated with an operational parameter of an asset being monitored. The signal may correspond to one or more packets. The one or more packets may be transmitted in the time slot at one or more frequencies so that the one or more packets are transmitted in parallel in the time slot.

In another example, a plurality of sensor devices may each be monitoring an asset. Each sensor device may generate a signal associated with an operational parameter of a respective asset being monitored by the sensor device. Each sensor device may then send one or more packets to a router corresponding to its received signal. The plurality of sensor devices may send the signals, e.g., packets, in a same time slot. For example, sensor device 1 may send a packet to router 1 and sensor device 2 may send a packet to router 2 in the same time slot. Each packet may be transmitted in the time slot at a different frequency so that the packets are transmitted in parallel in the time slot.

In yet another example, a plurality of routers may each send a signal, e.g., packet, with same data (e.g., operational parameters) to a gateway in a same time slot. Each packet may be transmitted at a different frequency in the time slot. Packets with same data transmitted on the same time slot to the same receiver device but at different frequencies may promote link bonding. Link bonding may provide improved reliability with electrical redundancy.

In addition to devices of the WSAN transmitting packets in a time slot, devices may also receive packets in a time slot. For example, a packet may be transmitted from a source device to a destination device in a time slot at a given frequency. The destination device may receive the packet at the given frequency in the time slot. Further, in the same time slot, the destination device may send an acknowledgement to the source device that the packet was successfully received. Then, in a next time slot, the destination device may transmit the packet at a frequency different from the given frequency to another device in the the WSAN.

The transmit and receive process may be repeated for each subsequent time slot until the packet reaches a destination device such as a gateway device or an actuator device. In this regard, the packet may be transmitted from a source device to a destination device via one or more "hops." Other arrangements are also possible for transmission of the packets.

Signals may be transmitted in other ways in the WSAN. For example, a router device and/or gateway device may transmit packets to one or more other devices in the WSAN rather than the sensor device. For example, in a next time slot, each device which received a packet may transmit the received packet to another device. Further, each device may transmit the packet at a different frequency from which a packet was received.

In embodiments, multiple packets may be transmitted from a source device such as a sensor device or gateway to a destination device such as the gateway or actuator. The multiple packets may contain same data, e.g., operational parameters from an asset. The multiple packets may be transmitted over one or more routes from the source device to the destination device. If transmitted via different routes, then the parallel transmission and/or reception may introduce redundancies which reduce probability of failure due to interference or malfunctioning nodes and improves a probability of at least one packet being received at the destination device without error. If transmitted via a same route, then the parallel transmission and/or reception of the packets at each node may provide redundancy which reduces probability of retransmissions at a node and therefore reduce latency.

In embodiments, a gateway may define a schedule by which the devices in the WSAN are to transmit signals in a time slot. The schedule may specify a time slot when a signal, e.g., packet, is to be received by a device and at which frequency. Further, the schedule may specify a time slot when a signal (e.g., packet which was received in a prior time slot) is to be transmitted by a device and a frequency over which the signal is to be transmitted. The gateway may provide the schedule to each device in the WSAN so that each device may receive and/or transmit the signal in an appropriate time slot and frequency in accordance with the schedule. The device in the WSAN may receive or transmit one or more signals in this manner.

The device on the WSAN may have a software stack which defines a protocol for transmission and reception of signals. The software stack may include one or more of an application layer, networking layer, media access layer (MAC layer), a supplemental MAC layer (SUP_MAC layer), and a physical layer (PHY layer). The layers may achieve the parallel transmission and reception of signals over the WSAN in accordance with embodiments.

The application layer may define general parameters associated with transmission and/or reception of signals by the devices on the WSAN. For example, the application layer may allow for defining a number of packets that might be transmitted and/or received in parallel in a time slot on the WSAN and/or a sample rate of a sensor device for sampling an operational parameter of an asset being monitored. Additionally, or alternatively, the application layer may define the schedule when devices are to transmit and/or receive signals in each time slot and at what frequency over the WSAN. Still additionally, or alternatively, the application layer may define a format of a MAC packet (MAC_PKT) associated with the MAC layer, including a size of a payload. Compared to a conventional MAC_PKT, the MAC_PKT may have an increased payload size. The payload size of MAC_PKT may proportional to the number of parallel transmissions and/or receptions in a time slot. Note that while MAC_PKT has an increased payload size, it may have a same width in time as the conventional MAC_PKT: a maximum data rate may be increased to accommodate more data into the same time slot so as to maintain backwards compatibility.

The network layer may define a superframe consisting of slot objects based on the schedule provided by the application layer. The superframe may relate to a configuration for transmission and/or reception of packets by a given device in the WSAN in a given time slot. Each slot object may identify for a timeslot, one or more of a timestamp which uniquely identifies timing of the time slot, a number of parallel links for transmission or reception of packets in the timeslot, a type of each of the parallel links (receive, transmit, etc.), a frequency to transmit and/or receive packets for each link, and/or a number of transmitters or receivers associated with a link. A given device may be assigned one or more slot objects of the superframe so that it may know when to transmit and/or receive one or more packets in the time slot.

The MAC layer may execute state machines to comply with the timing requirements associated with the slot object.

During transmission, the MAC layer may generate a MAC_PKT and based on the MAC_PKT, the SUP_MAC layer may create one or more PHY_PKT. The one or more PHY_PKTs may have a same payload or different payload. The PHY_PKTs may be passed to a corresponding number of radios in the physical layer to achieve parallel transmission in a time slot in accordance with the schedule.

During reception, the MAC layer may generate a MAC_PKT and based on the MAC_PKT, the SUP_MAC layer may receive one or more PHY PKTs. The PKY_PKTs may define data packets received in accordance with the schedule. For example, upon availability of a receive time slot in the device schedule, the PHY_PKTs are received over one or more antennas on one or more frequencies and stored in the corresponding receive buffers of the radio modules.

Typically, the physical layer may include transmission/reception technologies for transmission/reception of signals in the WSAN. The physical layer may define a modulation scheme to use and similar low-level parameters. The physical layer may constitute of multiple radio modules which is determined by number of parallel transmissions/receptions.

The MAC layer may maintain backward compatibility with standard MAC layer processing. If parallel transmission of packets is not desired, a single MAC_PKT associated with transmission of a packet may be used to generate a single PHY_PKT. The single PHY_PKT may be used to achieve transmission of the packet in a time slot without parallelism otherwise supported by the MAC layer and SUP_MAC layer. If parallel reception of packets is not desired, a single MAC_PKT associated with transmission of a packet may be used to receive a single PHY_PKT. The single PHY_PKT may be received in a time slot without the parallelism otherwise supported by the MAC layer and SUP_MAC layer.

In embodiments, different frequencies may be assigned to a packet transmission in a time slot and for each hop. Assigning different frequency may minimize packet-to-packet interference and minimize probability of signal outage due to external interference.

The frequencies may be assigned based on a packet-to-packet interference factor $\beta$. The packet-to-packet interference factor $\beta$ may be calculated based on transmission power associated with transmitting a packet to a destination in the time slot. The packet-to-packet interference $\beta$ may also be calculated based on a line of sight propagation angle from the device that transmits the packet to the device that receives the packet.

The packet-to-packet interference factor $\beta$ may be calculated for each device which is to transmit a packet in a time slot. The higher the $\beta$, the higher the chances of interference for the packet. In this regard, frequency spacing between transmission frequencies used in the WSAN may need to be larger for a higher $\beta$ to get maximum possible rejection from a receiver's channel filters and/or additional bandpass or notch filters. Transmission frequencies may be allocated to the different devices for use in transmitting the packets based on the packet-to-packet interference factor β. The allocation of frequency transmission based on the packet-to-packet interference factor β may reduce chances of a packet being received in error and having to be retransmitted.

As discussed above, the examples provided herein are related to a method, system, and apparatus for transmission and/or reception of signals, e.g., data, packets, and/or data streams in a WSAN at different frequencies in a time slot which reduces need for retransmission.

In one embodiment of a wireless sensor actuator network, a method may comprise: determining a time slot for transmission of a signal to a first device and a second device in the wireless sensor actuator network, wherein the first device is different from the second device; and during the time slot, transmitting in parallel the signal (i) via a first frequency channel and first antenna to the first device and (ii) via a second frequency channel and second antenna to the second device; wherein the first frequency channel is different from the second frequency channel; and wherein the first frequency channel and the second frequency channel are selected based on a power level to transmit the signal to the first device, a power level to transmit the signal to the second device, an angle to transmit the signal to the first device, and an angle to transmit the signal to the second device. The time slot may be a first time slot and the signal may be a first signal. The method may further comprise: determining a second time slot which follows the first time slot in time for transmission of a second signal to a third device and a fourth device in the wireless sensor actuator network; and during the second time slot, transmitting in parallel the second signal (i) via a third frequency channel and third antenna to the third device and (ii) via a fourth frequency channel and fourth antenna to the fourth device; wherein the third frequency channel and fourth frequency channel are different from the first frequency and the second frequency channel. The signal may be a data packet. The method may further comprise generating, by a sensor device, the data packet. Transmitting in parallel the signal (i) via a first frequency channel and first antenna to the first device and (ii) via a second frequency channel and second antenna to the second device in parallel may comprise: receiving a media access layer packet; based on an indication in the media access layer packet, creating a first physical layer packet and the second physical layer packet based on the media access layer packet; and providing the first physical layer packet and the second physical layer packet to respective radios for respective transmission of the signal to the first device and the second device. A number of bits in a payload of the media access layer packet may vary based on an amount of data generated by a sensor device in a time interval. The method may comprise receiving a schedule from a gateway of the wireless sensor actuator network, wherein the schedule identifies the time slot, the first frequency channel and the second frequency channel for transmission of the first signal and second signal respectively. The first frequency channel and second frequency channel may each define non-overlapping ranges of frequencies. The signal may a first signal. The method may further comprise receiving a second signal at a third frequency and third antenna and a third signal at a fourth frequency and fourth antenna in parallel with transmitting the first signal to the first device and the second device. Receiving the second signal at the third frequency and third antenna may comprise applying a notch filter to the second signal to reject frequencies associated with the third signal that interfere with the second signal. The method may further comprise receiving a schedule from a gateway of the wireless sensor actuator network, wherein the schedule identifies a number of transmissions in the time slot, wherein the number of transmissions is greater than or equal to two.

In another embodiment of a wireless sensor actuator network, a device may comprise: a first module configured to determine a time slot for transmission of a signal to a first device and a second device in the wireless sensor actuator network, wherein the first device is different from the second device; and a second module configured to transmit the signal in parallel (i) via a first frequency channel and first antenna to the first device and (ii) via a second frequency channel and second antenna to the second device, wherein the signal is transmitted during the time slot; wherein the first frequency channel is different from the second frequency channel; and wherein the first frequency channel and the second frequency channel are selected based on a power level to transmit the signal to the first device, a power level to transmit the signal to the second device, an angle to transmit the signal to the first device, and an angle to transmit the signal to the second device. Transmitting the signal (i) via a first frequency channel and first antenna to the first device and (ii) via a second frequency channel and second antenna to the second device in parallel may comprise: receiving a media access layer packet; based on an indication in the media access layer packet, creating a first physical layer packet and the second physical layer packet based on the media access layer packet; and providing the first physical layer packet and the second physical layer packet to respective radios for respective transmission of the signal to the first device and the second device. The device may further comprise a third module to receive a schedule from a gateway of the wireless sensor actuator network, wherein the schedule indicates the time slot, the first frequency channel and the second frequency channel for transmission of the first signal and second signal respectively. The first frequency channel and second frequency channel may each define non-overlapping ranges of frequencies. The signal may be a data packet.

In another embodiment of a wireless sensor actuator network, a device may comprise: a first module configured to determine a time slot for transmission of a signal to a first device and a second device in the wireless sensor actuator network, wherein the first device is different from the second device; and a second module configured to transmit the signal in parallel (i) via a first frequency channel and first antenna to the first device and (ii) via a second frequency channel and second antenna to the second device, wherein the signal is transmitted during the time slot; wherein the first frequency channel is different from the second frequency channel; and wherein the first frequency channel and the second frequency channel are selected based on a power level to transmit the signal to the first device, a power level to transmit the signal to the second device, an angle to transmit the signal to the first device, and an angle to transmit the signal to the second device. Transmitting the signal (i) via a first frequency channel and first antenna to the first device and (ii) via a second frequency channel and second antenna to the second device in parallel may comprise: receiving a media access layer packet; creating a first physical layer packet and the second physical layer packet based on the media access layer packet; and providing the first physical layer packet and the second physical layer packet to respective radios for respective transmission of the signal to the first device and the second device. The device may further comprise a third module to receive a schedule from a gateway of the wireless sensor actuator network, wherein the schedule indicates the time slot, the first frequency channel and the second frequency channel for transmission of the first signal and second signal respectively. The first frequency channel and second frequency channel may each define non-overlapping ranges of frequencies. The signal may be a data packet.

In yet another embodiment of a wireless sensor actuator network, a method may comprise: determining, by a device, a time slot for receiving a first signal and a second signal transmitted in the wireless sensor actuator network; during the time slot, receiving in parallel, by the device, (i) the first signal via a first frequency channel and first antenna of the device and (ii) the second signal via a second frequency channel and second antenna; wherein the first frequency channel is different than the second frequency channel; and wherein the first frequency channel and the second frequency channel are selected based on a power level to transmit the first signal to the device, a power level to transmit the second signal to the device, an angle to transmit the first signal to the device, and an angle to transmit the second signal to the device. Receiving in parallel (i) the first signal via a first frequency channel and first antenna of the device and (ii) the second signal via a second frequency channel and second antenna of the device may comprise receiving in parallel (i) a first packet over a first frequency channel and first antenna and (ii) a second packet over a second frequency channel and second antenna. Receiving in parallel (i) the first signal over a first frequency channel and first antenna of the device and (ii) the second signal over a second frequency channel and second antenna may comprise receiving a first physical layer packet and a second physical layer packet from respective radios in accordance with a schedule that identifies the time slot, the first frequency channel and the second frequency channel for reception of the first signal and second signal. The first frequency channel and second frequency channel may each define non-overlapping ranges of frequencies. Receiving in parallel (i) the first signal via a first frequency channel and first antenna of the device and (ii) the second signal via a second frequency channel and second antenna may comprise applying a notch filter to the first signal to reject frequencies associated with the second signal that interfere with the first signal and applying a notch filter to the second signal to reject frequencies associated with the first signal that interfere with the second signal.

One of ordinary skill in the art will appreciate these as well as numerous other aspects in reading the following disclosure.

BRIEF DESCRIPTION OF THE DRAWINGS

Features, aspects, and advantages of the presently disclosed technology may be better understood with regard to the following description, appended claims, and accompanying drawings where:

FIGS. 12a and 12b show an example schedule and example superframe associated with transmission of signals over a WSAN;

Figure 1:
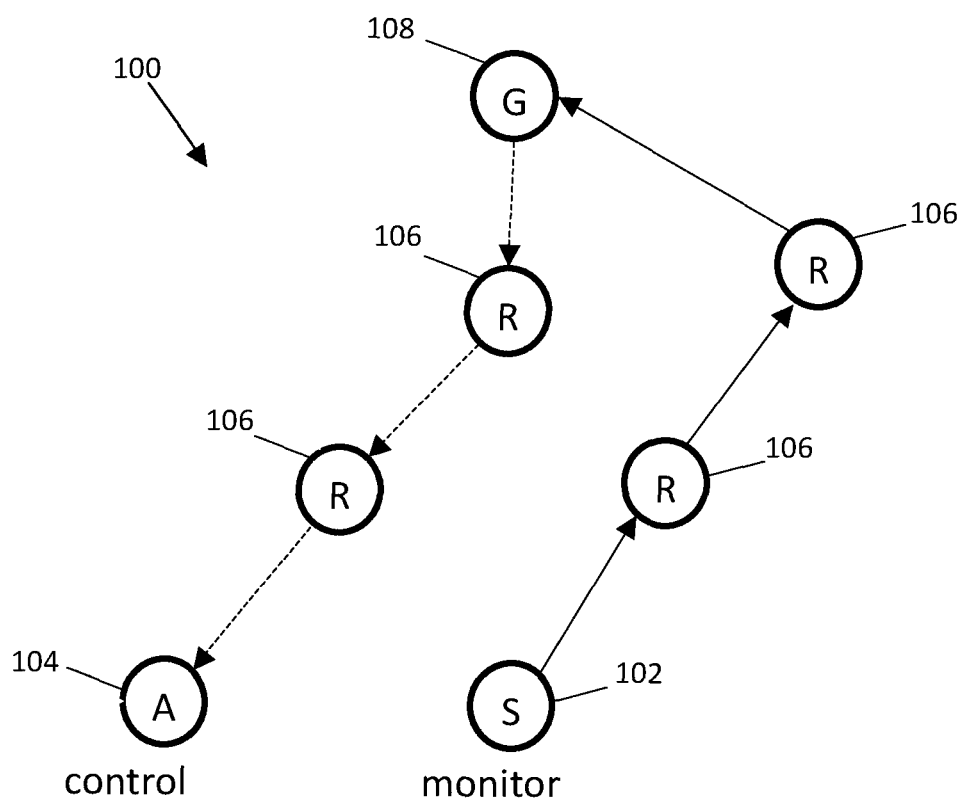
FIG. 1 shows an example topology of a wireless sensor and actuator network (WSAN)

The drawings are for the purpose of illustrating example embodiments, but it is understood that the inventions are not limited to the arrangements and instrumentality shown in the drawings.

DETAILED DESCRIPTION

Embodiments described herein are directed to transmission and/or reception of signals in a time synchronized wireless sensor actuator network (WSAN). The signals may be transmitted and/or received at one or more frequencies in a time slot which may reduce a need for retransmission. However, the described embodiments may not be limited to transmission and/or reception of signals in a WSAN. Signals may be transmitted and received in other types of time synchronized wireless networks in addition to or instead in the WSAN.

FIG. 1 shows an example wireless sensor and actuator network (WSAN) 100. The WSAN 100 may be arranged as a multi-hopping mesh network with various devices, e.g., stations. The devices may include one or more sensor devices (also referred to herein as a sensor) labeled as "S" 102, one or more actuator devices (also referred to herein as an actuator) labeled as "A" 104, one or more router devices (also referred to herein as a router) labeled as "R" 106, and one or more gateway devices (also referred to herein as a gateway) labeled as "G" 108.

The sensor device 102 may monitor a physical parameter of an asset. The physical parameters may include temperature, pressure, flow, level, vibration, etc. The sensor device 102 may convert a physical parameter into a voltage or current, which in turn is converted to a digital code representing the voltage/current representation of the sensed physical parameter. A wireless transmitter associated with the sensor device 102 may then transmit a signal corresponding to the digital code represented by the sensed physical parameter to the gateway device 108.

The router device 106 may function to route the signal from the sensor device 102 to the gateway device 108. The router device 106 may have a receiver for receiving the signal and a transmitter for transmitting the signal to another router device 106 and/or to the gateway device 108 depending on a route between the sensor device 102 and the gateway device 108. In the WSAN 100, the signal would be transmitted from the sensor device 102 to the gateway device 108 via two "hops" via two routers 106 to the gateway device 108.

The gateway device 108 may serve as a destination for the signal sent from the sensor device 102. The gateway device 108 may be fixed or mobile.

Additionally, the gateway device 108 may send a control signal to the actuator device 104, via the router device 106. The control signal may be based on the signal received from the sensor device 102. The control signal may cause the actuator device 104 to be adjusted, thereby assuring optimal system performance. The actuator device 104 can be servo or motor for adjusting an operating condition, e.g., a valve position or engine speed, on the asset. The actuator device 104 may receive the control signal and cause a control element on the actuator to be adjusted. For example, a valve position may be adjusted to regulate air flow to stabilize an ambient temperature control variable when the sensor device 102 is monitoring temperature in another location. For example, an engine speed may be adjusted to reduce fuel consumption. Other variations are also possible.

The WSAN topology may take a variety of forms in addition the topology described in FIG. 1. In general, the devices may be connected to a gateway device via one or more hops. For example, if the WSAN is arranged in a star configuration, a device may communicate with a gateway device via a central node. For example, if the WSAN is arranged in a mesh configuration, a device may communicate with a gateway device via one or more intermediary nodes. Embodiments herein are not limited by the WSAN topology.

The sensor device 102, actuator device 104, router device 106 and gateway device 108 may implement a networking framework to facilitate communications between devices. The networking framework may conform to a time synchronized protocol such as a slot-based Time Division Multiple Access (TDMA) protocol.

Figure 2A:
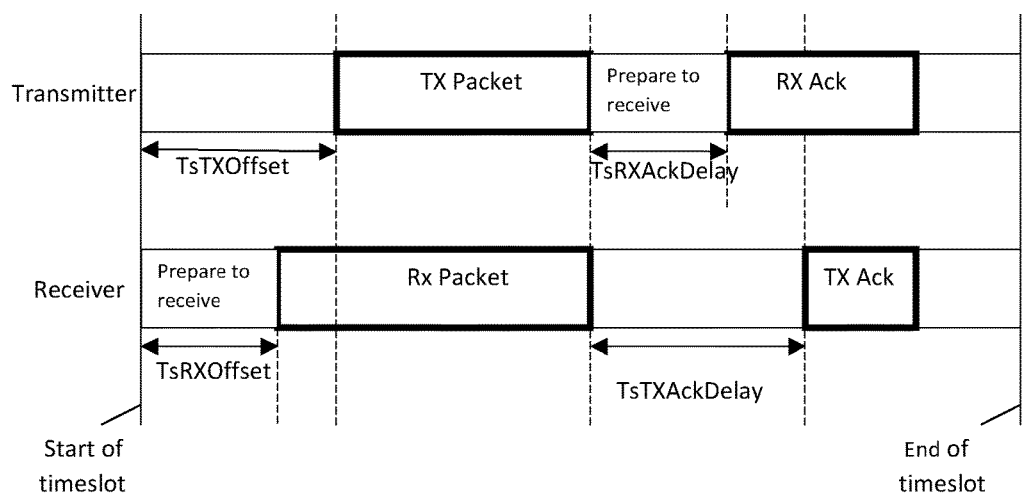
FIG. 2a shows an example time slot.

FIG. 2a shows an example of this time slot. The time slot may be an interval of time, e.g., between a start of timeslot and end of time slot, when a device may transmit or receive a signal. During transmission, a transmitter may send a signal, e.g., TX packet, to a receiver after a TsTXOffset. The TsTXOffset may be a startup time for the transmitter. The time slot may be long enough for the transmitter to receive an acknowledgement, RX Ack, of the transmission before the end of time slot. The RX Ack may be received after an TxRXAckDelay associated with preparation by the transmitter to receive the Rx Ack. Similarly, and in parallel with the transmission, a receiver may receive a signal, e.g., RX Packet, in the same time slot and then send an acknowledgement before the end of time slot. Typically, the receiver starts receiving the RX Packet before the TX Packet is transmitted. This time is indicated by TsRXOffset, which may be shorter than the TxTXOffset. Timing of transmission and/or reception in a time slot may take other forms as well.

The gateway device may facilitate synchronization of transmission and reception of signals between devices. The devices on the WSAN, e.g., sensors, routers, actuators, and gateway, may have a clock for establishing timing on the WSAN. The clock on the gateway may be considered a master clock to which the clocks on the other devices synchronize.

The clocks may be synchronized in a variety of ways. In one example, the gateway device may provide time stamps associated with the master clock to the other devices on the WSAN. The timestamp may indicate a time on the master clock. In another example, the time stamp may be propagated from device to device via an acknowledgement message which indicates whether a packet is received without error. In yet another example, a device can request timestamps directly from the gateway and update its clock based on the timestamp. Upon receipt of the time stamp, a device may adjust a local clock to synchronize to the master clock. Other arrangements are also possible including different synchronization mechanisms and/or devices other than the gateway having the master clock.

The clock synchronization can enable each device to knows when a time slot starts and ends for purposes of synchronously transmitting and/or receiving signals on the WSAN. The signals may be transmitted in the time slots in a variety of manners. For example, the signals may be transmitted based on the IEEE 802.15.4 protocol or Bluetooth Low Energy (BLE) protocol. Other variations are also possible.

The time slots may enable signals to be transmitted and/or received in parallel. Signals may be considered to be transmitted and/or received in parallel when transmitted in a same time slot and at different frequencies at a same time. In one example, a plurality of TX packets may be transmitted in the timeslot shown FIG. 2a at the same time. The plurality of TX packets may be transmitted at different frequencies during the timeslot so as to achieve parallel transmission of the plurality of packets at a same time. In another example, a plurality of RX packets may be received in the timeslot shown FIG. 2a at the same time. The plurality of RX packets may be received at different frequencies during the timeslot so as to achieve parallel reception of the plurality of packets at a same time. Additionally, or alternatively, signals may be considered to be transmitted and/or received in parallel when transmitted in a same time slot and at different frequencies so long as the signals are transmitted and/or received within a time slot.

The signals that are transmitted in the time slot may be the same signal, e.g., carry same information. Parallel transmission and/or reception of the same signal over different routes may introduce redundancies which reduce probability of failure due to interference or malfunctioning nodes. In other words, the transmission over different routes may improve the probability of the signal being received without error at a destination. Parallel transmission and/or reception may also provide redundancy in a weakest link of the network which may be the final hop to the gateway or the actuator. In other words, parallel transmission may also provide additional spatial diversity (Nth order for N parallel routes) which reduce a probability of retransmissions and therefore reduce latency.

Embodiments may not be limited to transmission of a same signal in a same time slot. In other embodiments, the signals that are transmitted in the time slot may be different signals, e.g., carry different information.

Figure 2B:
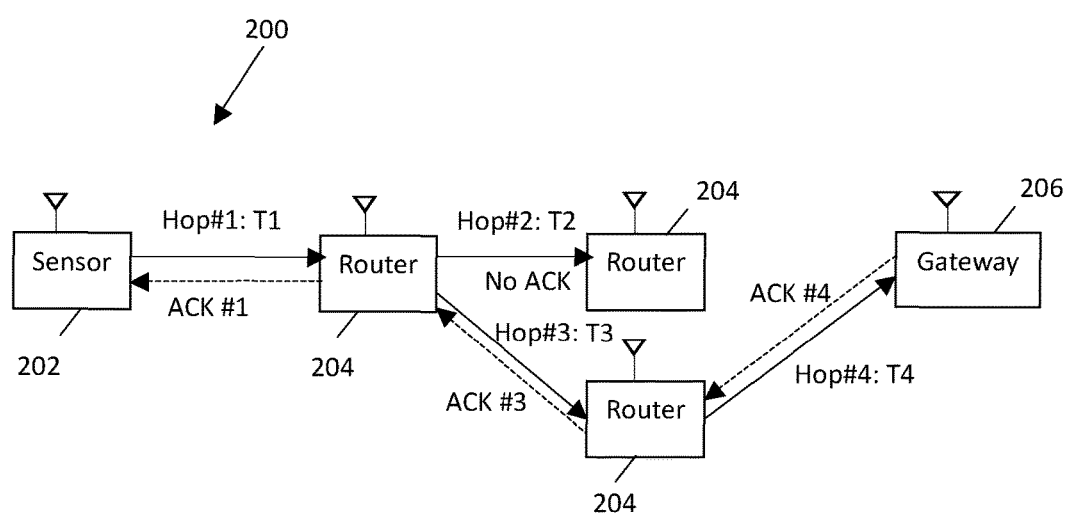
FIG. 2b shows an example WSAN for a monitoring application.
Figure 2C:
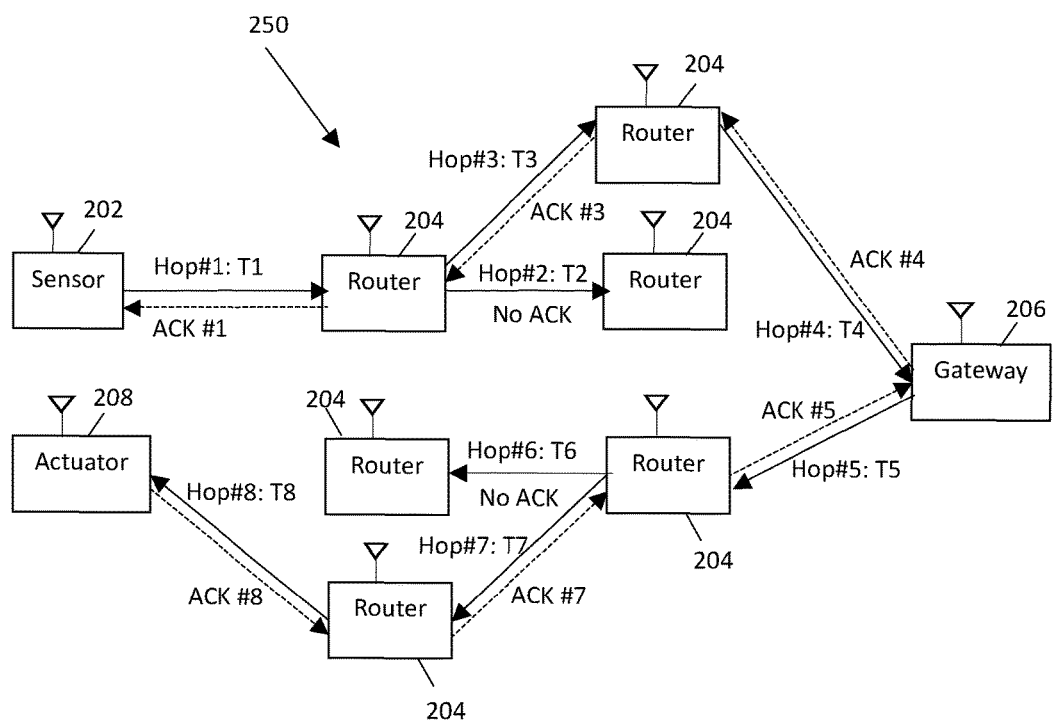
FIG. 2c shows an example WSAN for a control application.

FIGS. 2b and 2c show a more detailed view of a monitoring operation 200 and control operation 250, respectively, in an WSAN. Signals may be transmitted in the WSAN over different routes using time slots. The terms signal, data, packets, data packets, data stream etc. may be used interchangeably herein to refer to mechanisms for transmitting information over the WSAN.

The monitoring operation 200 of FIG. 2b may involve a sensor device 202 sending over multiple hops a signal, e.g., packet, to a gateway device 206 via routers device 204. A hop may be defined as a transmission from one device, e.g., sensor, router, gateway, actuator, to another device, e.g., sensor, router, gateway, or actuator. Every transmission from device to device in the WSAN may occur at a time slot T. Different time slots are indicated as T1, T2, T3 etc. and may represent different instances of time.

The control operation 250 of FIG. 2c may involve a sensor device 202 sending over multiple hops a signal, e.g., packet, to a gateway device 206 via router device 204. Then, the gateway device 206 may send over multiple hops a packet via router device 204 to an actuator device 208.

Figure 2D:
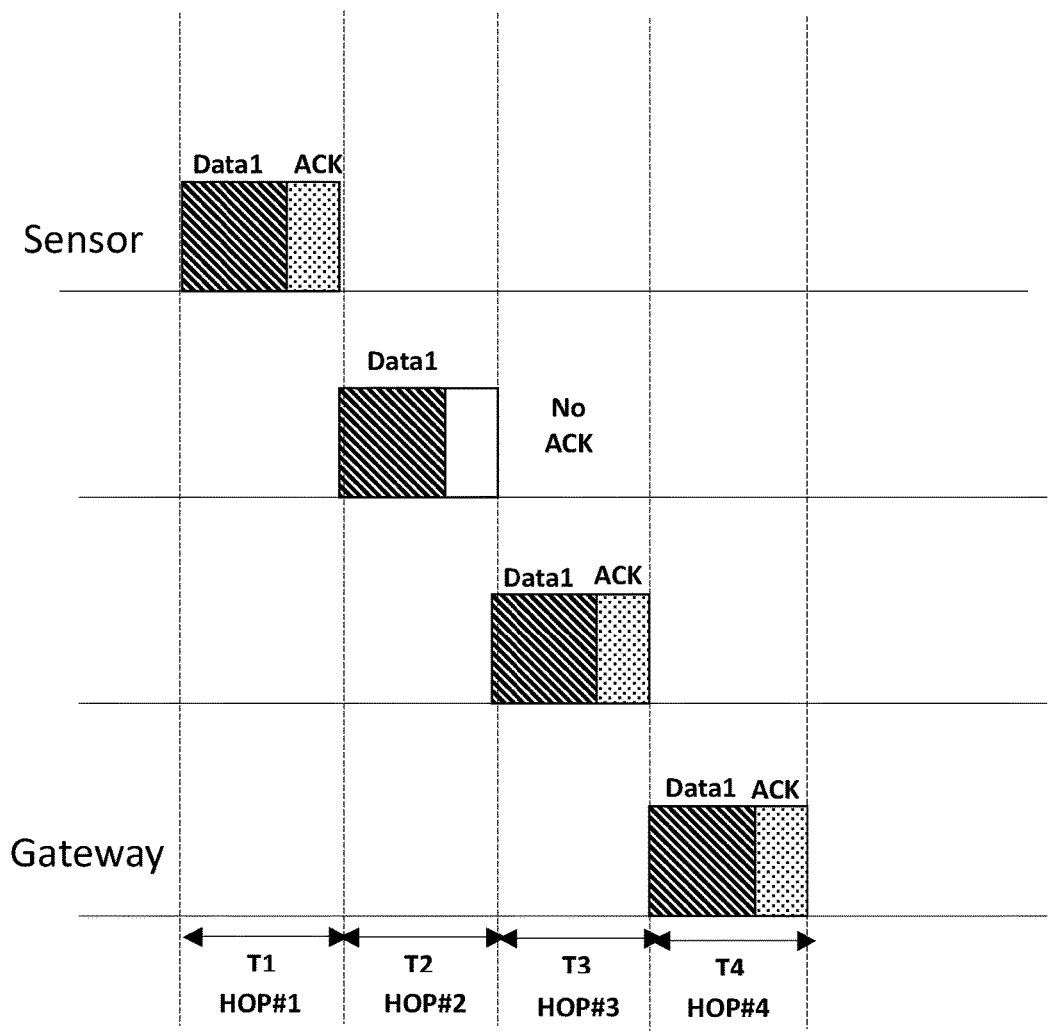
FIG. 2d shows an example timing diagram for the monitoring application.

FIG. 2d shows an example timing diagram associated with the monitoring operation 200 of FIG. 2b. Signals in the form of packets may be transmitted in time slots. At T1, a data packet may be transmitted by the sensor device 202. At T2 and T3, the data packet may be transmitted from one router device 204 to another router device 204. At T4, a router device 204 may transmit the data packet to the gateway device 206. Further, a receiving device, e.g., router, sensor, gateway, may send an acknowledgement ACK to the transmitting device, e.g., router, sensor, gateway, upon receipt of the data packet. For example, router device 204 may receive a data packet at T3 and then send an acknowledgement that the data packet was received back to router device 204 which sent the data packet. If the transmitting device does not receive an acknowledgement during the time slot, it can retransmit on a different route. For example, router device 204 may not receive an acknowledgement from router device 204 at T2. At T3, router device 204 may retransmit the packet on a different route to router device 204 at T3 and receive an acknowledgement. Each hop may represent a different time slot. Accordingly, in this example, a total of 4 hops, i.e., 4 time slots, may be needed for a single data packet to propagate from the sensor device 202 to the gateway device 206.

In some embodiments, the transmitter may decide to drop a packet rather than retransmit the packet. The decision to drop the packet may depend on the criticality of the data. Typically monitoring applications can afford a higher packet drop rate compared to control applications which require an action to be performed. Further, a weakest link in the WSAN network may be a last hop to the gateway device in monitoring applications and a last hop to to the actuator device in control applications. The last hop may be a weakest link because limited routes is available to the gateway device or actuator device. If the data packet cannot be dropped, the transmitting device may retransmit as many times as needed until the data packet is received.

Bandwidth and jitter may affect how long a signal, e.g., packet, takes to be transmitted from a source device to a destination device. Bandwidth defines an amount of data that can be transmitted in a period of time. The bandwidth may be measured in bit rate or throughput. Jitter is a variation in latency of a signal as transmitted from the source device to the destination device. The latency may be based on whether a signal needs to be retransmitted due to signal interference and/or how many hops may be needed for the data packet to travel from a source device to a destination device.

Latency may impact performance of a monitoring application. For example, if the WSAN requires 10 hops for a successful data packet transmission and each hop is on a 10 ms time slot, latency may be 100 ms. If retransmissions are needed, then latency may increase.

A size of the time slot may be determined by the maximum allowable data-rate and the data payload size per frame of a wireless standard. For example, IEEE 802.15.4, which is commonly used in a WSAN, may define a maximum payload size of a packet ~100 Bytes or 1000 bits which is transmitted at a max data-rate of 250 Kbps. The transmit time for a single packet may be approximately 4 ms. A 10 ms time slot may be needed with 6 ms of overhead for inherent latencies in the device and acknowledgement processing. In this regard, latency of the WSAN may also be dependent on a size of the time slot.

The max data-rate could be increased by adopting a different wireless standard. The different wireless standard may transmit at a higher data rate in order to reduce the time slot and latency. However, standards that offer higher data-rates usually exhibit trade-offs in power consumption, complexity and more importantly link robustness.

Frequency diversity may also be used to to reduce probability of failure due to interference. Devices in the WSAN may transmit signals simultaneously on different frequencies on a same time slot. The terms frequency, channels, frequency channels, channel frequencies, etc. may also be used herein interchangeably to refer to spectra for transmitting and/or receiving data over the WSAN. In some examples, the different frequencies may be non-overlapping spectra. Frequency diversity may reduce retransmissions and/or packet loss due to interference or multi-path propagation events in the environment. Latency may also be reduced because streams are transmitted at a same time, e.g., in parallel over a plurality of frequencies, rather than serially.

Figure 3A:
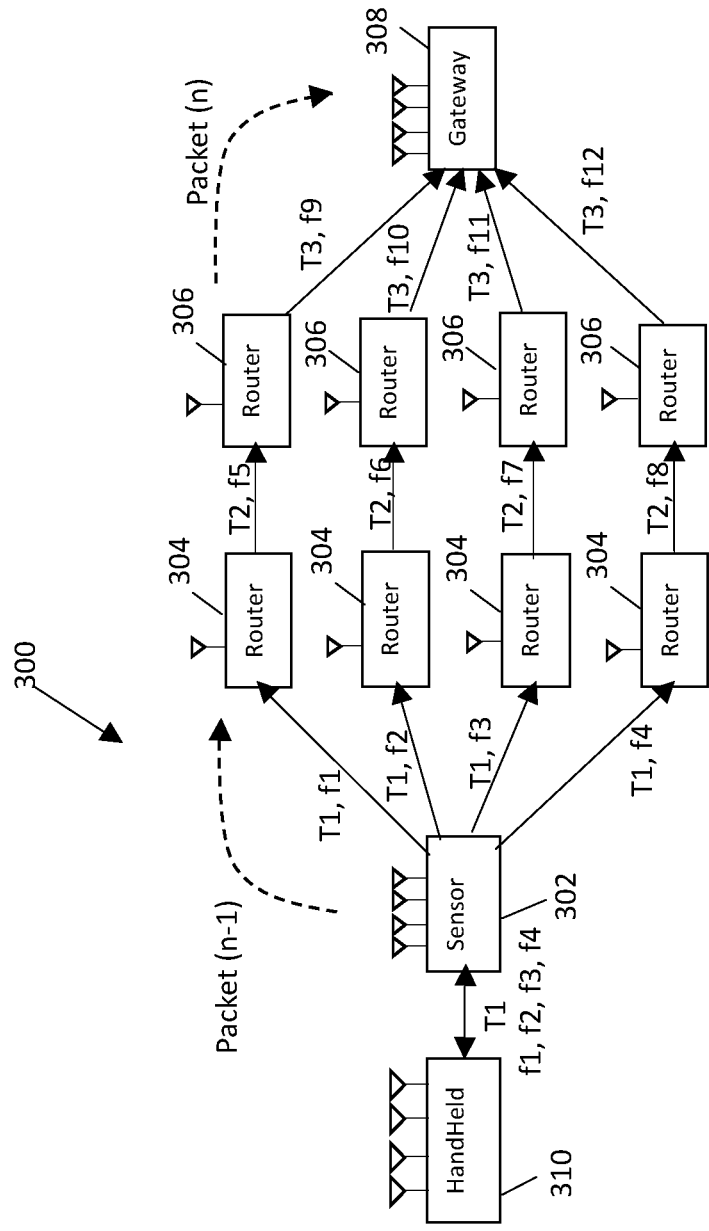
FIGS. 3a, 3b, and 3c show example multi-hop transmissions for monitoring and/or control applications in a WSAN.
Figure 3B:
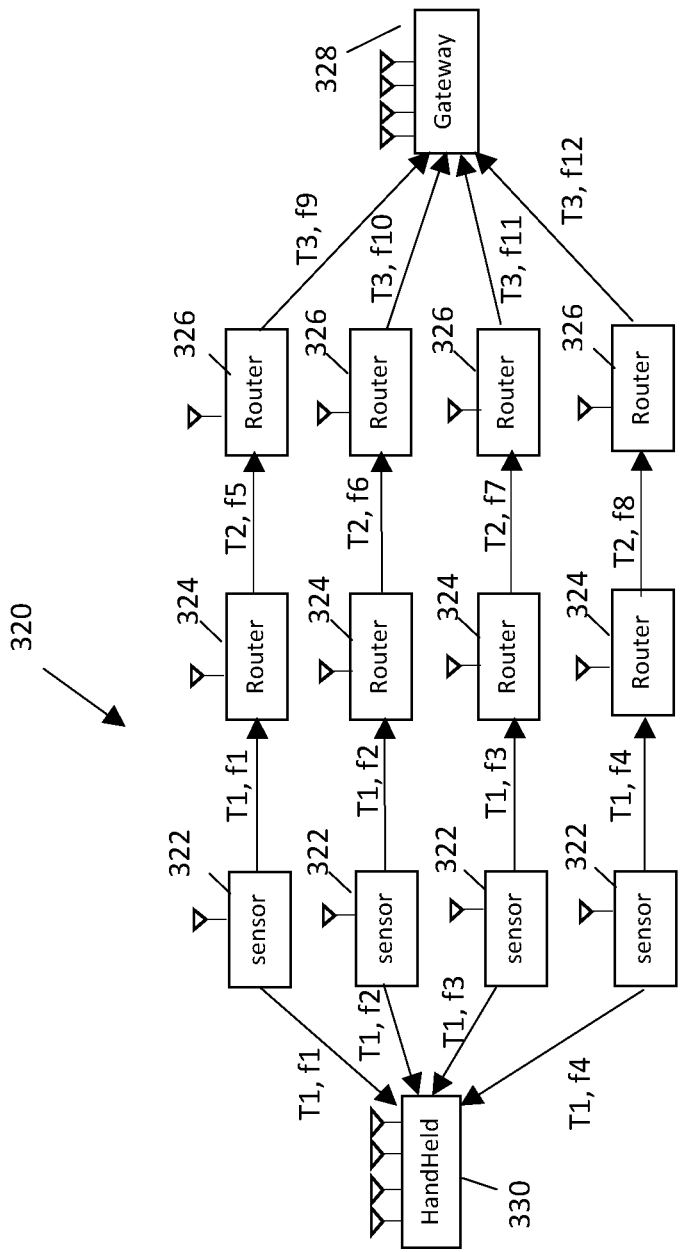
Figure 3C:
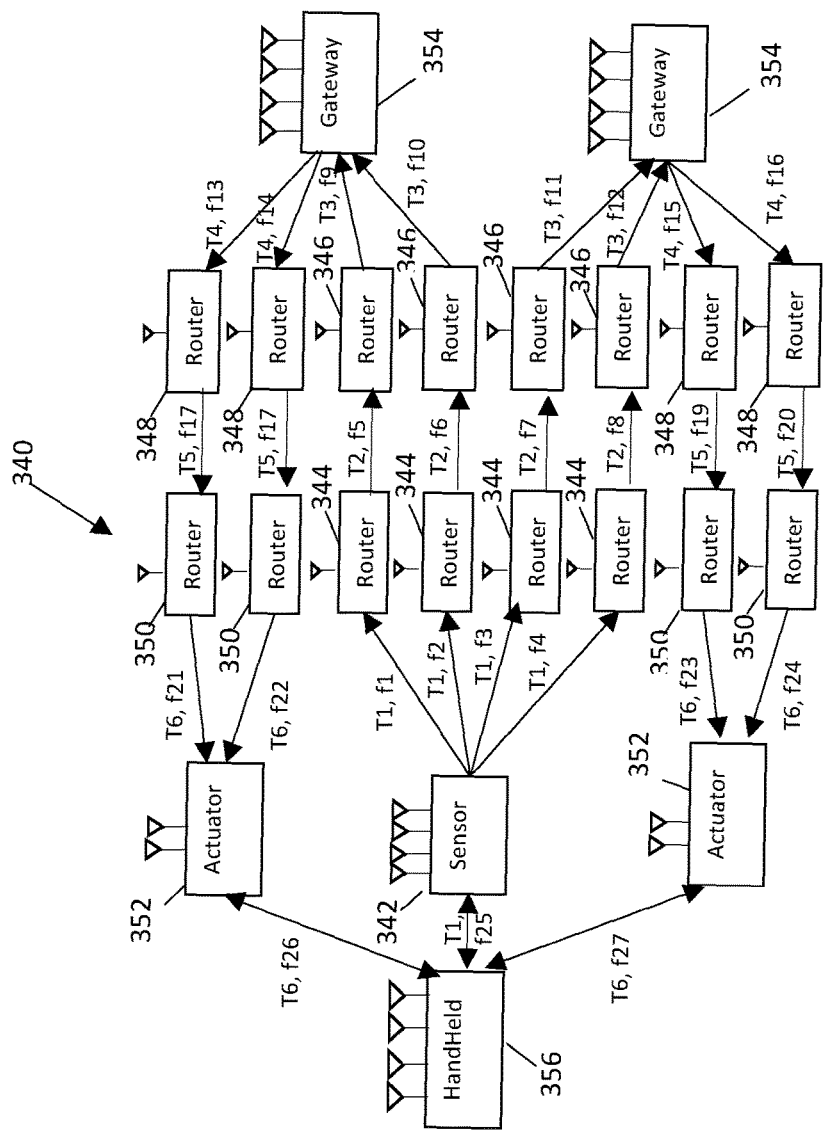

FIG. 3a-3c shows examples of a multi-hop mesh network for monitoring and control applications. Signals may be transmitted in the WSAN over different routes at different frequencies in the timeslots so as to improve jitter in the WSAN.

FIG. 3a shows an example monitoring application 300 where data collected by a sensor 302 may be de-multiplexed into several streams and transmitted on different routes via routers 304, 306 to a gateway 308. The transmitted data may be the same data sent via different routes at different frequencies. For example, sensor 302 may transmit the same data, e.g., same data packet, at time slot T1 to routers at a respective frequency F1-F4. In some cases, a mobile device, e.g., handheld device 310, may also receive the data in a same time slot T1. In turn, a respective router 304 may transmit the data to another respective router 306 on at time slot T2 at a respective frequency F5-F8 over different routes. Then, a router 306 may transmit the data to the gateway 308 at time slot T3 at a respective frequency F9-F12. Data from these routes may be received by the gateway 308. The gateway 308 may then recover the transmitted data.

Receiving the same data over multiple routes may increase redundancy and allow for reliable recovery of the transmitted data. Probability of retransmission due to interference and associated latency may be reduced.

In some embodiments, the data transmitted by a device in parallel may be different data and not the same data. For example, a block of large data (such as images) may be divided into multiple packets and transmitted/received in parallel in a time slot which increases the overall throughput for the block data transmission.

FIG. 3b shows another example monitoring application 320 where data is collected by from several sensors 322. Each sensor 322 may send data to one more respective routers 324, 326 on different routes at a different frequency during a same time slot. In some cases, a mobile device 330, e.g., handheld device, may also receive the data in a same time slot. The data may then be received by the gateway 328. For example, sensors1, sensor2, sensor 3, and sensor 4 may transmit respective data at time slot T1 to routers at a respective frequencies F1-F4. In turn, each router 324 may transmit the respective data to another router 326 at time slot T2 at a respective frequency F5-F8 over different routes. Then, a router 326 may transmit the respective data to the gateway 328 at time slot T3 at a respective frequency F9-F12. Heterogeneous data from these different sensors, propagated on parallel routes may be received by the gateway 328 in a same time slot. The transmission of the data from sensor1, sensor 2, sensor 3, and sensor 4 in a tine slot at different frequencies may increase throughput associated with transmission of the heterogeneous data.

FIG. 3c shows an example control application 340 where data from a sensor device 342 can be routed to two different actuators 352 controlled by two different gateways 354. Probability of retransmission due to interference and thus latency may be reduced by defining multiple routes at different frequencies in a time slot. For example, a sensor device 342 may transmit at time slot T1 data, e.g., same data or different data, to a respective router 344 at a respective frequency F1-F4. For example, a router 344 may transmit at time slot T2 the data to a respective router 346 at a respective frequency F5-F8. For example, a router 346 may transmit at time slot T3 the data to a respective gateway 354 at a respective frequency F11-F12. For example, the gateway 354 may transmit at time slot T4 respective control data to a respective router 348 at a respective frequency F13-F16. For example, the router 348 may transmit at time slot T5 the respective control data to a respective router 350 at a respective frequency F17-F20. For example, the router 350 may transmit at time slot T6 the respective control data to a respective actuator 352 at a respective frequency F21-F24. The respective control data which is transmitted may be received by the actuator 352. In some cases, a mobile device 356, e.g., handheld device, may also receive the data sent by the sensor 342 and/or received by the actuator 352 in a same time slot.

Receiving the same data over multiple routes may increase redundancy and allow for reliable recovery of the transmitted data. Probability of retransmission due to interference and latency may be reduced. The transmission of same data at the same time at different frequencies may also reduce latency.

In some embodiments, the data and/or signals transmitted and/or received may take the form of multiple packets. Data pipelining based on transmission of packets at different frequencies may further be used to increase throughput in the WSAN. For example, consecutive groups of packets that are transmitted over the WSAN may be separated by two hops (also referred to as pipe-line factor). This results in overall transmission time for large numbers of packets to be equivalent to two hops.

Figure 4A:
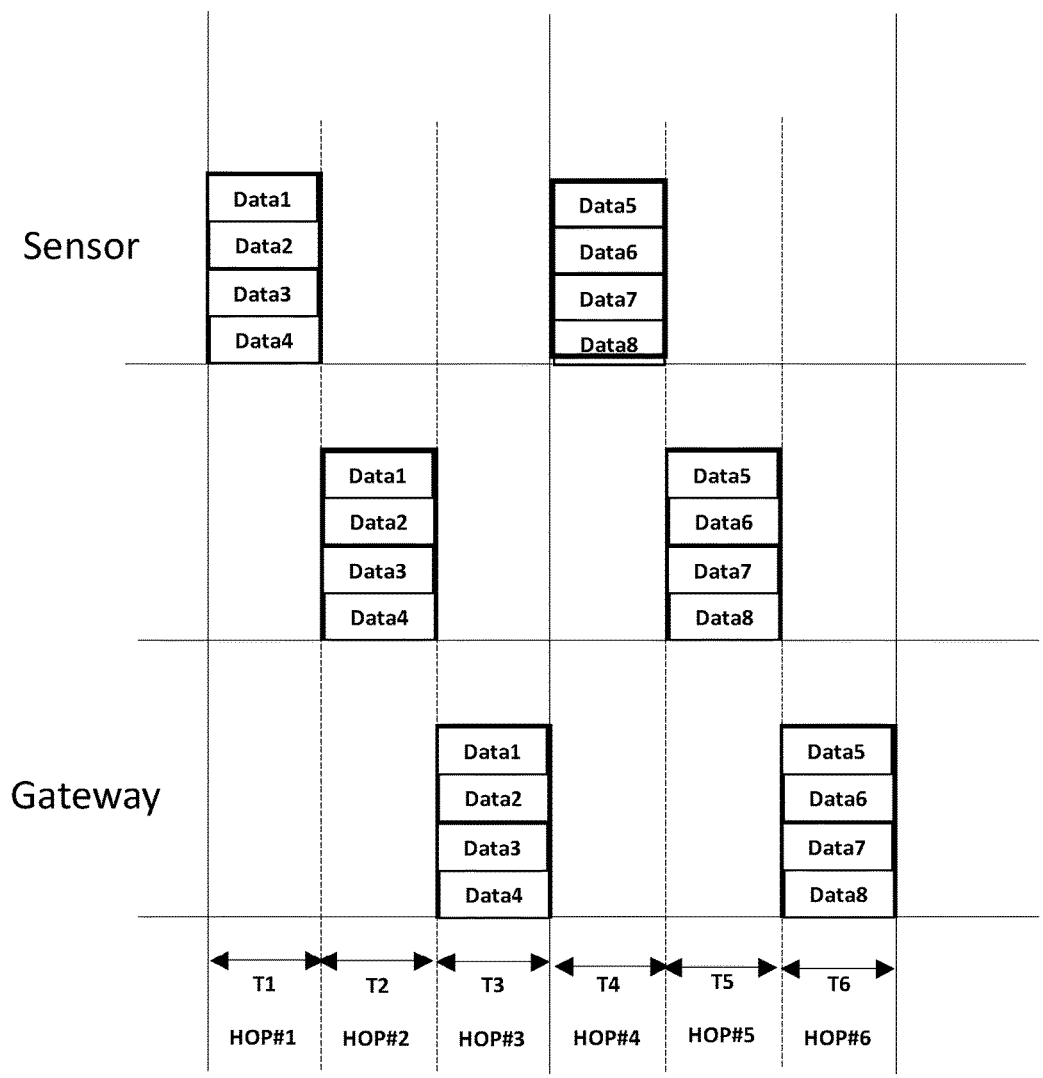
FIGS. 4a and 4b show example timing diagrams associated with a WSAN.

FIG. 4a shows a timing diagram without data pipelining. Four packets, Data1 to Data4, may be transmitted at a same time (i.e., in a time slot) at different frequencies to achieve parallel transmission. Each time slot may be represented as a slot T1, T2, T3, T4, T5, or T6. For example, in T1, Data 1 may be transmitted at frequency channel 1, Data 2 may be transmitted at frequency channel 2, Data 3 may be transmitted at frequency channel 3, Data 4 may be transmitted at frequency channel 4. For example, in T2, Data 1 may be transmitted at frequency channel 5, Data 2 may be transmitted at frequency channel 6, Data 3 may be transmitted at frequency channel 7, Data 4 may be transmitted at frequency channel 8. Without data pipelining, 3 hops may be needed for each data set of four packets, Data1-Data4 and Data5-Data8 (transmitted in a manner similar to Data1-Data4), to propagate from a sensor to a gateway for a total of 6 hops for the 8 data packets.

Figure 4B:
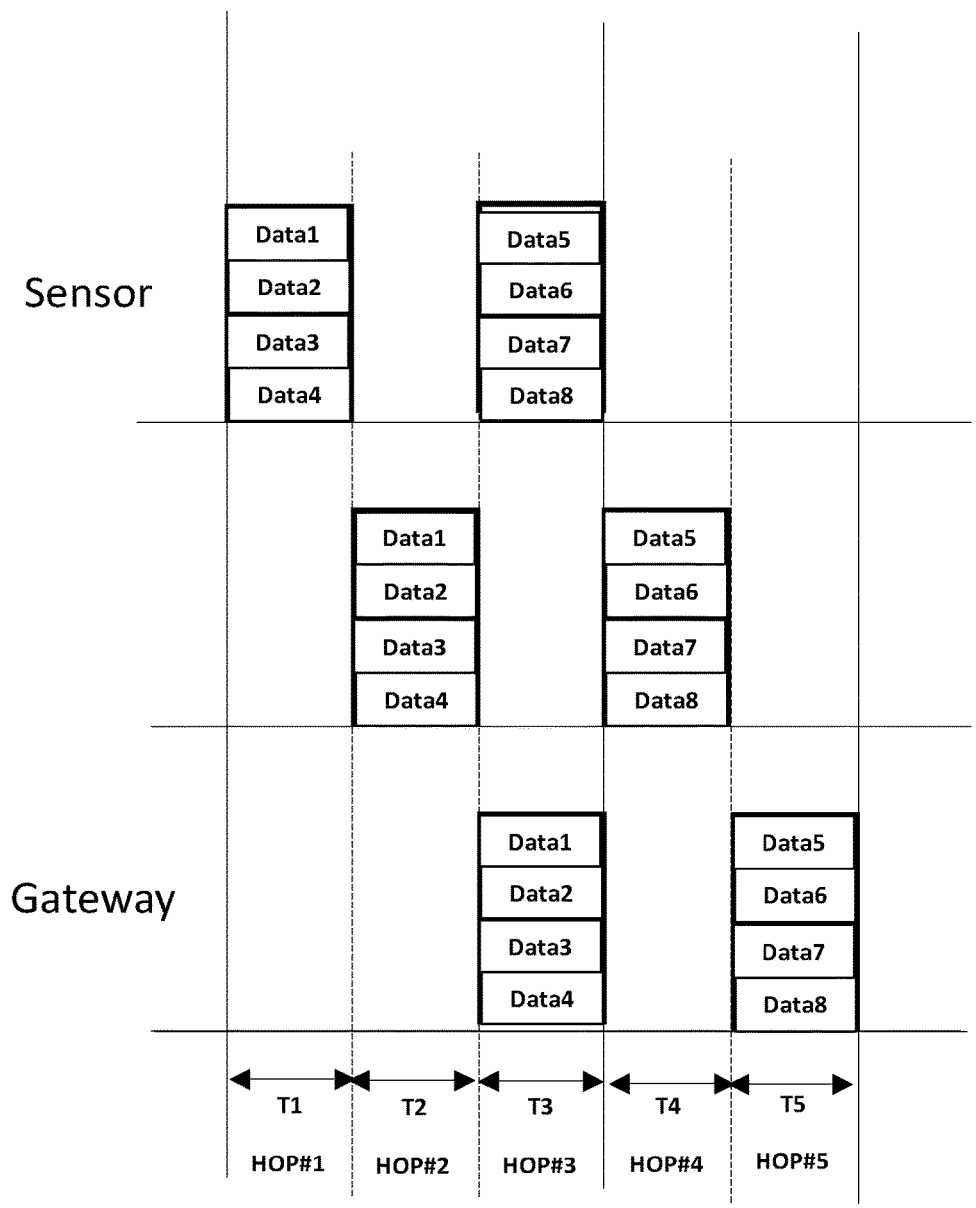

FIG. 4b shows the timing diagram with data pipelining. With data pipelining, 5 hops may be needed to transmit the same number of packets. For example, at hop 3, all eight packets, Data1-Data4 and Data5-Data8, may be transmitted in the same time slot at different frequencies, i.e., pipelined. The transmission of data at different frequencies at a same time may reduce latency.

Generally, the data rate (equivalent to bits/s) may be defined as as number of data packets over a number of time slots required for propagation from source to destination. In the example of FIGS. 4a and 4b, the data rate without parallelism is ⅓ packet/slot. With parallelism and no pipelining data rate increases to 8/6 (~4×). With parallelism and pipelining data rate increases to 8/5 (~5×). Furthermore, for multi-packet data sizes, the data-rate improvement with pipelining increases linearly with number of hops needed for data propagation.

Figure 5:
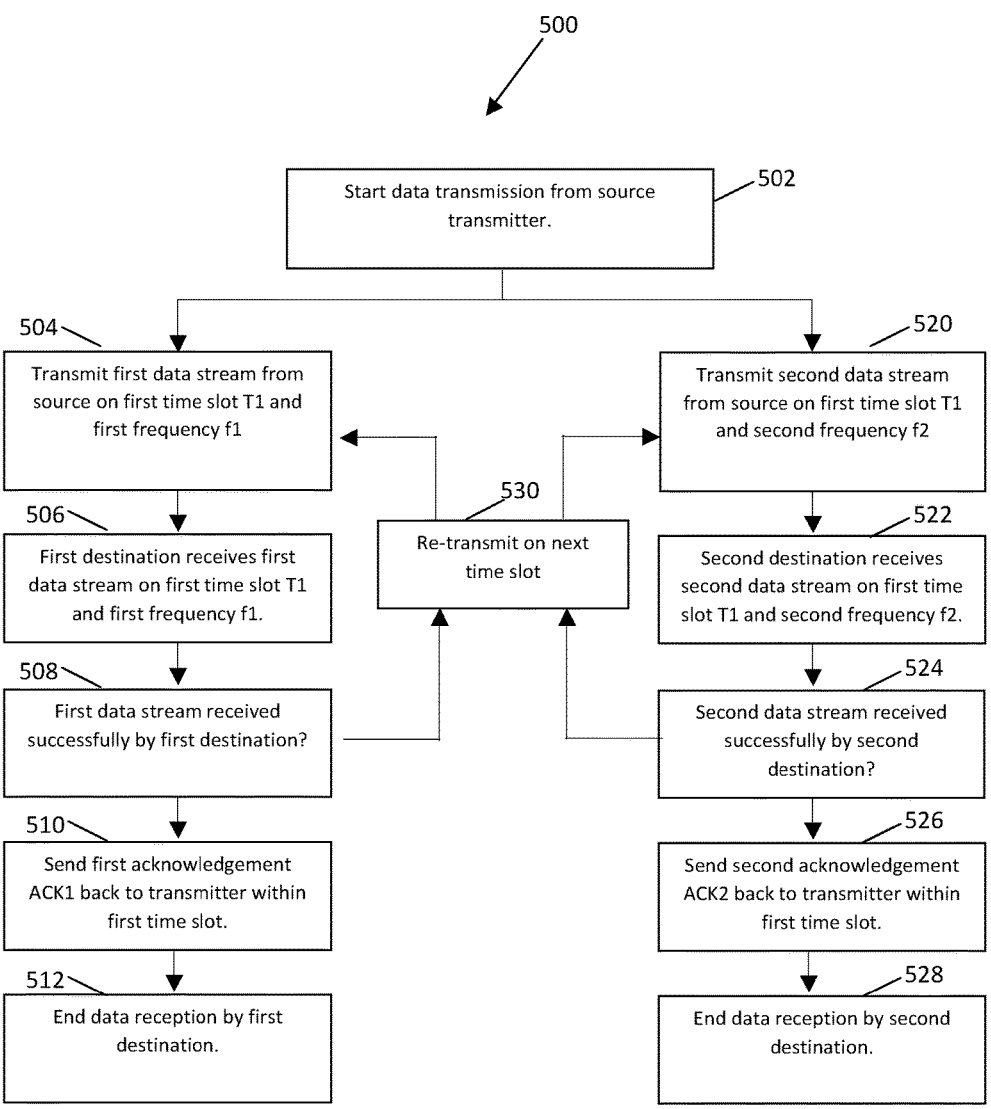
FIGS. 5 and 6 show example flow charts of functions associated with transmission of signals over a WSAN.

FIG. 5 shows functions 500 associated with transmission of data streams from a same device in a same time slot in accordance with the example embodiments shown in FIG. 3a-3c. For example, the functions may be directed to transmission of the data streams from a sensor, router, or gateway to a plurality of receivers (e.g., routers, actuators, and/or gateways). The data streams may be the same or different data streams. The data streams may take the form of one or more packets, among other data structures. In some embodiments, the functions 500 may be extended to more than two streams.

At 502, data transmission from a source transmitter such as a sensor, gateway, and/or router may start. For example, packets may be placed in a queue of the source transmitter. At 504, a source transmitter may transmit a packet of a first data stream on a first time slot and a first frequency. At 506, a destination receiver may receive the packet from the first data stream. At 508, a determination may be made whether the packet from the first data stream is received successfully. If the packet from the first data stream is received successfully, then at 510, an acknowledgement may be sent back to the source transmitter. The acknowledgment may indicate that the packet was received successfully. At 512, data reception may end. If the packet from the first data stream is not received successfully, then at 530, the source transmitter may retransmit the packet from the first data stream on a next time slot and at a same or different frequency.

Similarly, at 520, the source transmitter may transmit a packet from a second data stream on the first time slot and a second frequency. At 522, a destination receiver may receive the packet from the second data stream. At 524, a determination may be made whether the packet from the second data stream is received successfully. If the packet from the second data stream is received successfully, then at 526, an acknowledgement may be sent back to the source transmitter. At 528, data reception may end. If the packet from the second data stream is not received successfully, then at 530, the source transmitter may retransmit the packet from the second data stream on a next time slot and at a same or different frequency.

Figure 6:
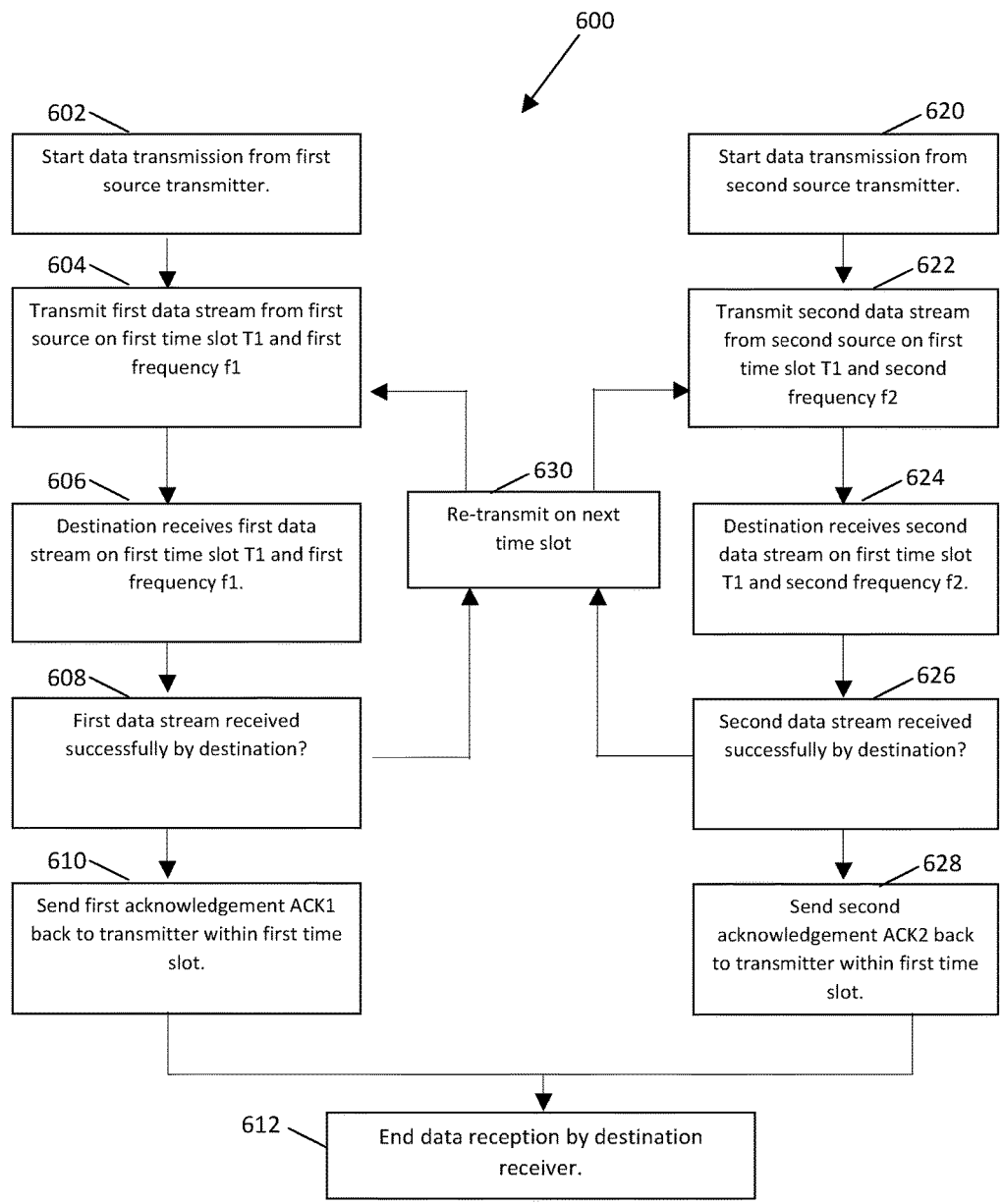

FIG. 6 shows functions 600 associated with transmission of data streams from different devices in a same time slot in accordance with example embodiments shown in FIG. 3a-3c. For example, the functions may be directed to transmission by two transmitters (routers, sensors or gateways) which transmit to other respective receivers (routers, actuators or gateways) in a same time slot. The data streams may be the same or different data streams. The data streams may take the form of one or more packets, among other data structures. In some embodiments, the functions 600 may be extended to more than two data streams.

At 602, data transmission of a first source transmitter may start. For example, a data packet of a first data stream maybe placed in queue of a first source transmitter buffer. At 604, a source transmitter such as a sensor, gateway, and/or router may transmit the packet of the first data stream on a first time slot and a first frequency. At 606, a destination receiver may receive the packet of the first data stream. At 608, a determination may be made whether the packet of the first data stream is received successfully. If the packet of the first data stream is received successfully, then at 610, an acknowledgement may be sent back to the source transmitter. At 612, data reception may end. If the packet of the first data stream is not received successfully, then at 630, the source transmitter may retransmit the packet of the first data stream on a next time slot and at a same or different frequency.

In embodiments, the first data stream and the second data stream may be from different routers, sensors, or gateways. At 620, data transmission of a second source transmitter may start. For example, a data packet of the second data stream may be placed in queue of a second source transmitter buffer. At 622, another source transmitter may transmit the packet of the second data stream on the first time slot and a second frequency. At 624, a destination receiver may receive the packet of the second data stream. At 626, a determination may be made whether the packet of the second data stream is successfully received. If the packet of the second data stream is received successfully, then at 628, an acknowledgement may be sent back to the source transmitter. At 612, data reception may end. If the data packet of the second data stream is not received successfully, then at 630, the source transmitter may retransmit the packet of the second data stream on a next time slot and at a same or different frequency.

FIG. 7-10 show block diagrams of the devices or stations on the WSAN, e.g., sensor, router, gateway, and actuator, which may be arranged to transmit and/or receive signals, e.g., data, a data stream, or data packet, via one or more transmitters and/or receivers over one or more frequencies in accordance with embodiments.

Figure 7:
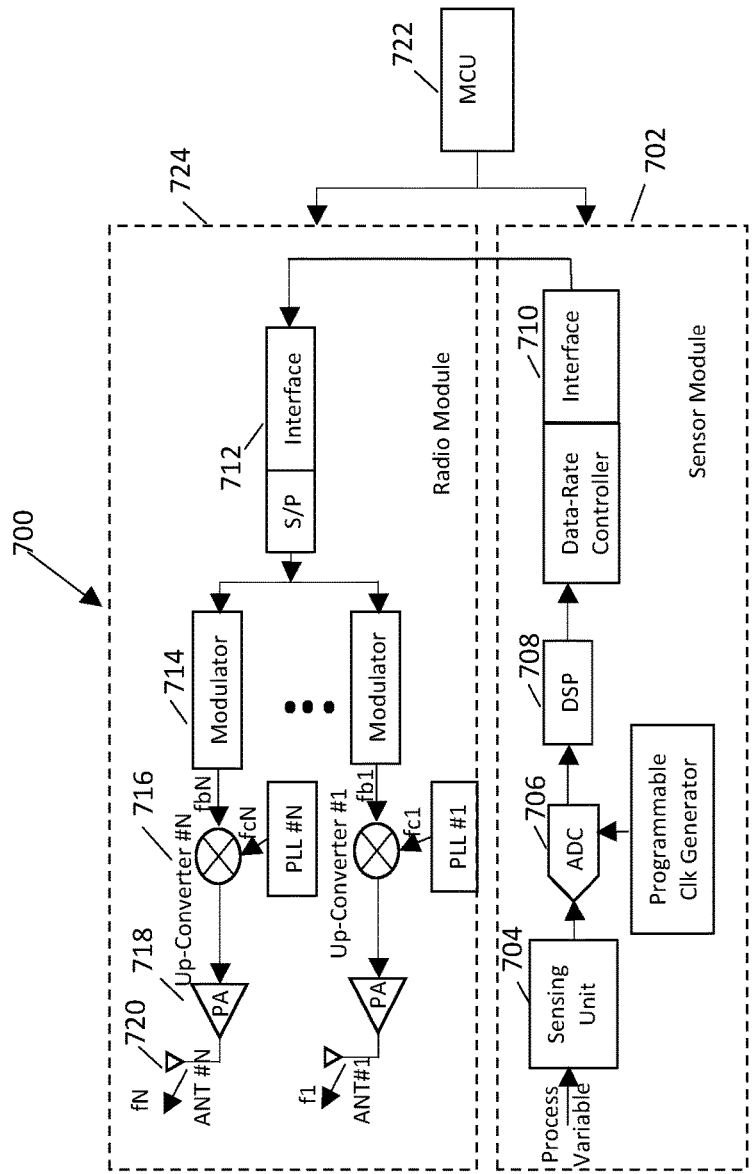
FIG. 7 shows a block diagram of an example sensor to enable transmission of signals over a WSAN.

FIG. 7 shows a block diagram of an example sensor 700 in accordance with embodiments. The sensor 700 may consist of a sensor module 702 and a radio module 724. The sensor module 702 may have a sensing unit 704 to measure operational parameters of an asset such as temperature, pressure, flow, level, vibration, etc. and convert these operational parameters into a voltage or current. The frequency of measurements may typically be predetermined by the application layer. An analog-to-digital converter (ADC) 706 may then generate digital codes representing the analog voltage/current representation of the sensed physical parameter. A digital signal processor (DSP) 708 may perform source coding for data compression and channel encoding on the digital codes from the ADC 706. The channel encoded data, e.g., serial data, may then be provided to the radio module 724 via a data rate controller and interface 710.

The radio module 724 may facilitate parallel transmission of the data from the sensor module 702, e.g., transmission of the data in a same time slot. The radio module 724 may have an interface 712 for receiving the serial data and generating N parallel streams from the serial data. The N parallel streams may be baseband signals. Each modulator 714 may convert the data from the sensor module 702 into data symbols with a pre-defined modulation scheme.

The modulation scheme may be chosen based on network level requirements for target applications such as capacity, energy consumption and link robustness. Trade-offs between all these parameters may also be taken into consideration. The modulation scheme may be set to meet requirements of energy consumption and link robustness. For example, in IEEE 802.15.4, Offset Quadrature Phase Shift Keying (O-QPSK) may be used as part of Direct Sequence Spread Spectrum.

An RF transceiver may up-convert 716 the data symbols to RF frequencies and amplify the RF signal with a power amplifier 718 for wireless transmission over an antenna 720. For example, one or more phase locked loops (PLLs) may be used to upconvert the data symbols to the RF frequency. The RF frequency and the output power levels may be chosen based on range requirements and spectrum availability. The output power may also determine energy consumption of the power amplifier 718 of the RF transceiver. The antenna 720 of the RF transceiver (and other devices described herein) may be either directional or omni-directional and its gain determines transmission range.

The N antennas 720 may transmit N RF signals which could be based on a combination of same or different RF carrier frequencies. OFDM, FDMA, FHSS may be examples of wireless standards which may use different RF carrier frequencies.

FIG. 7 shows that each upconverter N may be associated with a PLL N. Each PLL may generate a signal at a given frequency to upconvert to a given RF frequency. Other arrangements are also possible. For example, N upconverters 716 may be associated with M PLLs, where N is greater than M. In this case, one or more PLLs may generate a plurality of signals at a plurality of frequencies for upconversion to a plurality of RF frequencies. Other variations are also possible.

The RF frequency at which an RF signal is transmitted may also be dependent on the frequency of the baseband signal. In this regard, the frequency of the baseband signal along with the frequency of the PLL may determine the RF frequency.

The sensor 700 may also have a Micro-Controller Unit (MCU) 722. The MCU 722 may be responsible for managing state machines for mode control including power-up, power-down sequences, clock control, frame structure formation and detection for the sensor module 702 and the radio module 704. The sensor 700 may transmit data over one or more time slots. The MCU 722 may include a timer (e.g., local clock) for determining a start and/or end of a slot. The timer may be synchronized to a clock on the gateway. The MCU may also manage wake-up/sleep cycles and store network/communication protocol parameters. Further, the MCU 722 may also include SRAM and Flash memory units to store state information and application firmware. The MCU 722 may also have a power management module for managing power consumption. An amount of memory on the MCU 722 may typically determine the power consumption. Further, the memory on the MCU 722 may have low duty cycles of 10% where the average current is due to memory leakage current during sleep.

Figure 8:
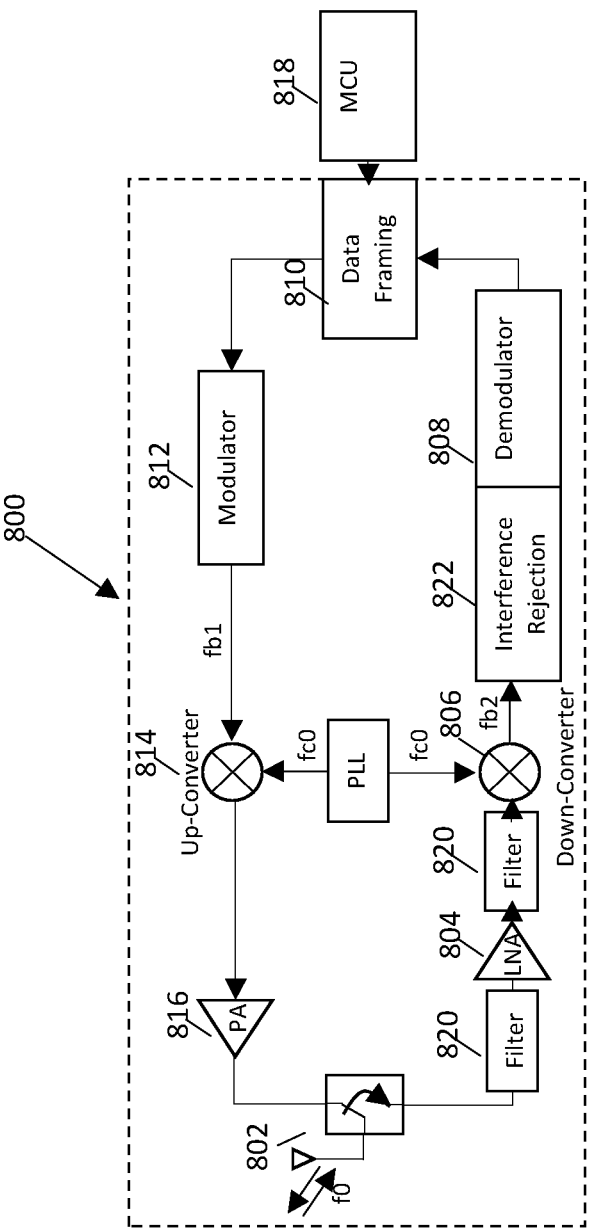
FIG. 8 shows a block diagram of an example wireless router to enable transmission and reception of signals over a WSAN.

FIG. 8 shows a block diagram of an example router 800 in accordance with embodiments. The router 800 may function as intermediate routing nodes in the WSAN. The router 800 may receive an RF signal from an antenna 802 (e.g., directional or omnidirectional) and amplify the received RF signal at a low noise amplifier (LNA) 804. A downconverter 806 may downconvert the RF signal from a particular RF channel to baseband via one or more PLLs. Each PLL may generate one or more signals at one or more frequencies. A demodulator 808 may equalize and detect baseband data and send an acknowledgement of receipt or no receipt of the data back to a transmitter. The baseband data may then be formatted into frames by a data framer 810 and looped back to a modulator 812. An upconverter 814 may upconvert a baseband signal representative of the baseband data via one or more PLLs to an RF signal, a power amplifier 816 may amplify the upconverted signal, and the antenna 802 may send the data to a next router or to an end-receiver. The receive and transmit operations may take place in different time slots or the same slot. The router 800 may also have an MCU 818.

The router 800 may also be configured with one or more filters 820. The filters 820 may take the form of an (a) RF bandpass and/or notch filters to reject adjacent and non-adjacent channel interference before the LNA 804 or after the LNA 804 or both; and (b) an interference rejection filter 822 (bandpass and/or notch) in the baseband to reject co-channel, adjacent channel and non-adjacent channel interference. Bandpass filters in RF and/or baseband may be used to reject external, ambient interference of unknown frequencies. Notch filters in RF and/or baseband may be used to reject packet-to-packet interference between packets in a time slot where a frequency of undesired packet may be known a priori. Multiple notch filters may be realized in RF and/or baseband tuned at different frequencies to reject multiple packet-to-packet interferers.

Figure 9:
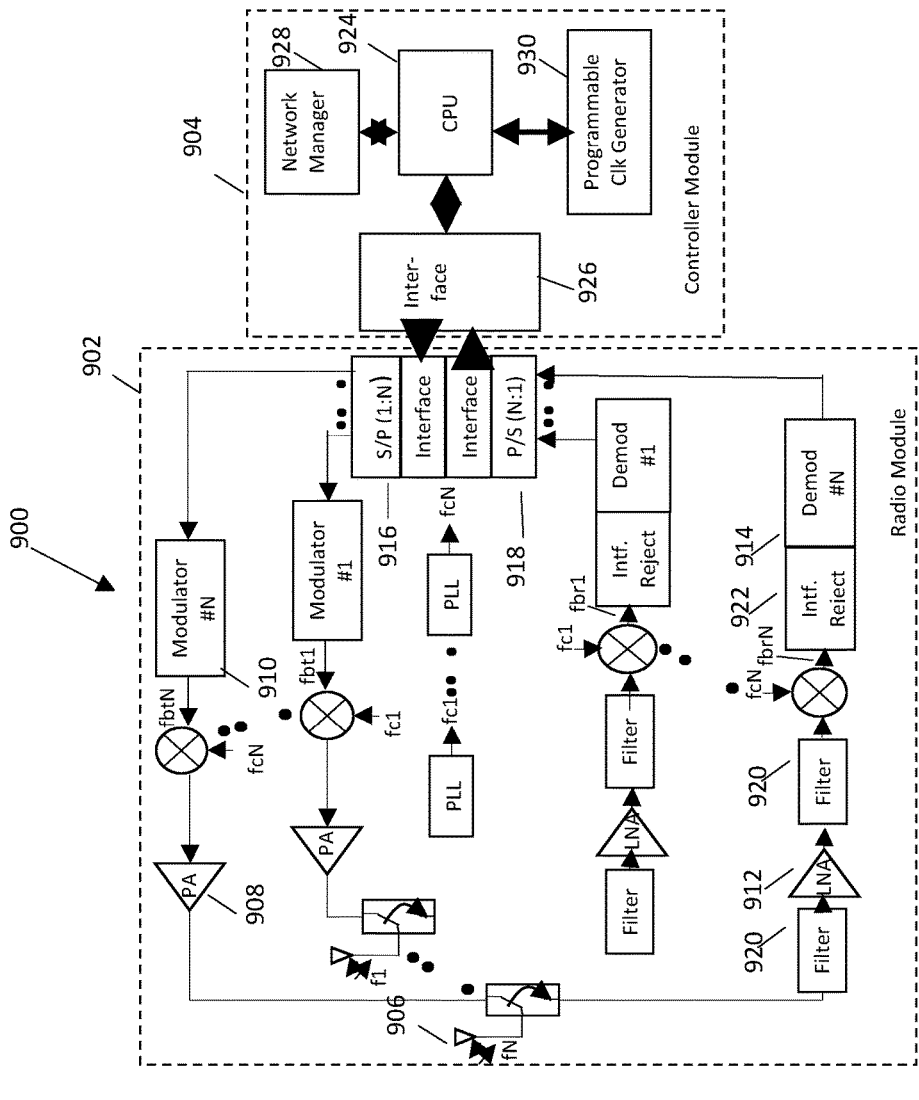
FIG. 9 shows a block diagram of an example gateway to enable transmission and reception of signals over a WSAN.

FIG. 9 shows a block diagram of an example gateway 900 in accordance with embodiments. The gateway 900 may serve as a destination for data sent from a sensor and a source for control data sent to actuators. The gateway 900 may have higher processing power compared to the field devices, e.g., sensors, actuators and routers.

The gateway 900 may comprise a radio module 902 and a controller module 904. The radio module 902 may include: (a) N antennas 906 (e.g., directional or omnidirectional). The N antennas 906 may transmit and/or receive N RF signals all on the same frequency and/or transmit or receive N RF signals on different frequency channels which may be a combination of same and/or different RF carrier frequencies and same and/or different baseband carrier frequencies.

The radio module 902 may also include (a) N transmit signal-paths and respective power amplifiers (PA) 908 (b) N modulators 910 (c) N receive signal-paths and respective low noise amplifiers (LNA) 912 (d) N demodulators 914 (e) 1:N programmable serial-to-parallel interface 916 for multiplexing transmit data; and (f) N:1 programmable parallel-to-serial interface 918 for de-multiplexing receive data. The radio module 902 may also include one or more PLLs for converting a baseband signal to an RF signal (e.g., in the transmit signal path) and an RF signal to a baseband signal (e.g., in the baseband signal path). Each PLL may generate one or more signals at one or more frequencies and be implemented in various manners, e.g., N PLL for M upconversions and/or downconversions where N<M.

The radio module 902 may have filters 920 which may take the form of RF bandpass and/or notch filters in each receive path to reject adjacent and non-adjacent channel interference in the receive signal path either before the LNA 912 or after the LNA 912 or both and an interference rejection filter 922 (bandpass and/or notch) in the baseband of each receive path to reject co-channel, adjacent channel and non-adjacent channel interference. Bandpass filters in RF and/or baseband may be used to reject external, ambient interference of unknown frequencies. Notch filters in RF and/or baseband may be used to reject packet-to-packet interference where frequency of undesired packet may be known a priori. Multiple notch filters may be realized in RF and/or baseband tuned at different frequencies to reject multiple packet-to-packet interferers.

The controller module 904 may include a CPU 924 for data processing. The CPU 924 may send data to the radio module 902 which converts the data from a serial stream into a parallel stream for transmission over the N antennas. Each transmission may be at a certain frequency. The CPU 924 may also process the data from the demodulator 914 received via the interface 918. In some embodiments, the data received from each demodulator 914 may represent same data, e.g., parallel streams of the same data. In this case, the CPU 920 may determine data representative of the data from each of the demodulators 914 and provide representative data to upper layer processing.

To illustrate, consider that the controller module 904 may receive 4 parallel streams, stream A to stream D. Error correction/detection may be applied to each of the parallel streams, and stream D may be determined to have a lowest error. The CPU 1108 may then send stream D to the upper layer processing. In this example, the CPU 920 may apply error correction and/or detection code to the data from each modulator and select the data from a modulator with a lowest error. Other arrangements are also possible.

Additionally, the controller module 904 may have a network manager 928. The network manager 928 may be responsible for setting, among others, predetermined routes in the WSAN for parallel transmission/reception of packets, timeslots at which the devices are to transmit/receive, and frequency channels at which the devices are to transmit/receive. The network manager 922 may define a schedule and send at least a portion thereof to each device. The schedule or portion thereof, details of which is further described below, may define one or more of an an appropriate time slot and/or frequency for transmission/reception of a signal by a device to achieve a desired level of reliability over the WSAN. Based on the schedule, a device may then know which time slot to transmit/receive at and on what frequency. The network manager 928 may also be responsible for sending time stamps to each of the devices in the WSAN so that the devices may remain time synchronized for transmission of signals in the time slots. Timing of the time stamps may be based on a programmable clock generator 930 on the controller module which may serve as a local clock for the gateway 900 and a master clock which each device in the WSAN may synchronize to.

Figure 10:
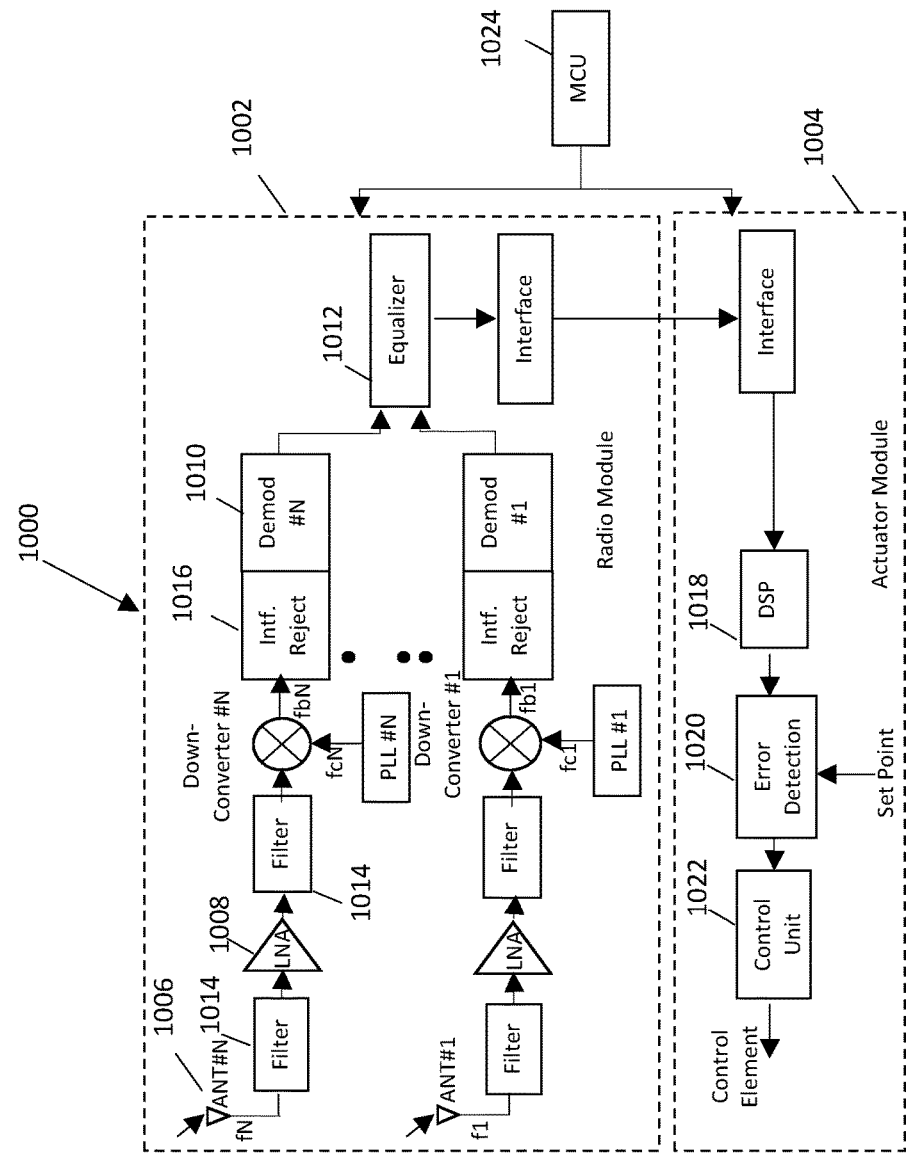
FIG. 10 shows a block diagram of an example actuator to enable reception of signals over a WSAN.

FIG. 10 is block diagram of an example actuator 1000 to facilitate parallel transmission in accordance with embodiments. The actuator 1000 may include a radio module 1002 and an actuator module 1004.

The radio module 1002 may include: (a) N antennas 1006 (b) N receive signal-paths with a LNA 1008 and N demodulators 1010; and (c) an equalizer 1012 in the baseband. The N antennas 1006 (e.g., directional or omnidirectional) may receive N RF signals on different frequency channels which could be a combination of same or different RF carrier frequencies and same or different baseband carrier frequencies and the LNA 1008 may amplify the signal. The demodulator 1010 may demodulate the signal to a baseband signal via one or more PLLs. Each PLL may generate one or more signals at one or more frequencies and be implemented in various manners, e.g., N PLL for M downconversions where N<M. An equalizer 1012 may equalize the signal so as to maximize signal to noise ratio of the data and detect control data.

Filters 1014 may include RF bandpass and/or notch filters in each receive path to reject adjacent and non-adjacent channel interference in the receive signal path either before the LNA 1008 or after the LNA 1008 or both. Interference rejection filter 1016 (bandpass and/or notch) may be in the baseband of each receive path to reject co-channel, adjacent channel and non-adjacent channel interference. The notch filters in RF and/or baseband may be used to reject packet-to-packet interference where frequency of undesired packet may be known a priori. Multiple notch filters may be realized in RF and/or baseband tuned at different frequencies to reject multiple packet-to-packet interferers. Bandpass filters in RF and/or baseband may be used to reject external, ambient interference of unknown frequencies.

The actuator module 1004 may have a DSP 1018 to decode the data, e.g., control data, which is received by the radio module 1002. The DSP 1018 may receive a plurality of signals from the radio module 1002. In some embodiments, each of the signals of the plurality of signals may represent a same control data, i.e., parallel streams of the same data. In this case, the DSP 1018 may determine a signal of the plurality of signals as representative of the control data based on the redundant data. The DSP 1018 may then apply the control data to an error detector 1020 to compare the data against a predefined set point. The set point may define a current setting of the actuator. The error may be amplified and sent to the control unit 1022 to adjust a control element. For example, a valve position may be set to 5 and the control data may indicate a setting of 10. Based on an error of 5, the valve position may be adjusted by 5 to a setting of 10. Other variations are also possible.

The control data may take other forms instead of representing a setting for the actuator. Instead, the control data may indicate an amount to adjust the actuator which is directly applied to the actuator. In this case, a comparison of the set point to the control data might not be needed to adjust the actuator. Other arrangements are also possible.

The actuator 1000 may also have an MCU 1024 arranged in a manner similar to that of the sensor and router.

Each of the devices on the WSAN may implement a software stack to standardize communications between the devices. The software stack may be stored in the MCU of the sensor, actuator, and/or router or network manager of the gateway. The software stack may be based on a modified version of the Open Systems Interconnection Model (OSI model) which characterizes communication functions.

Figure 11A:
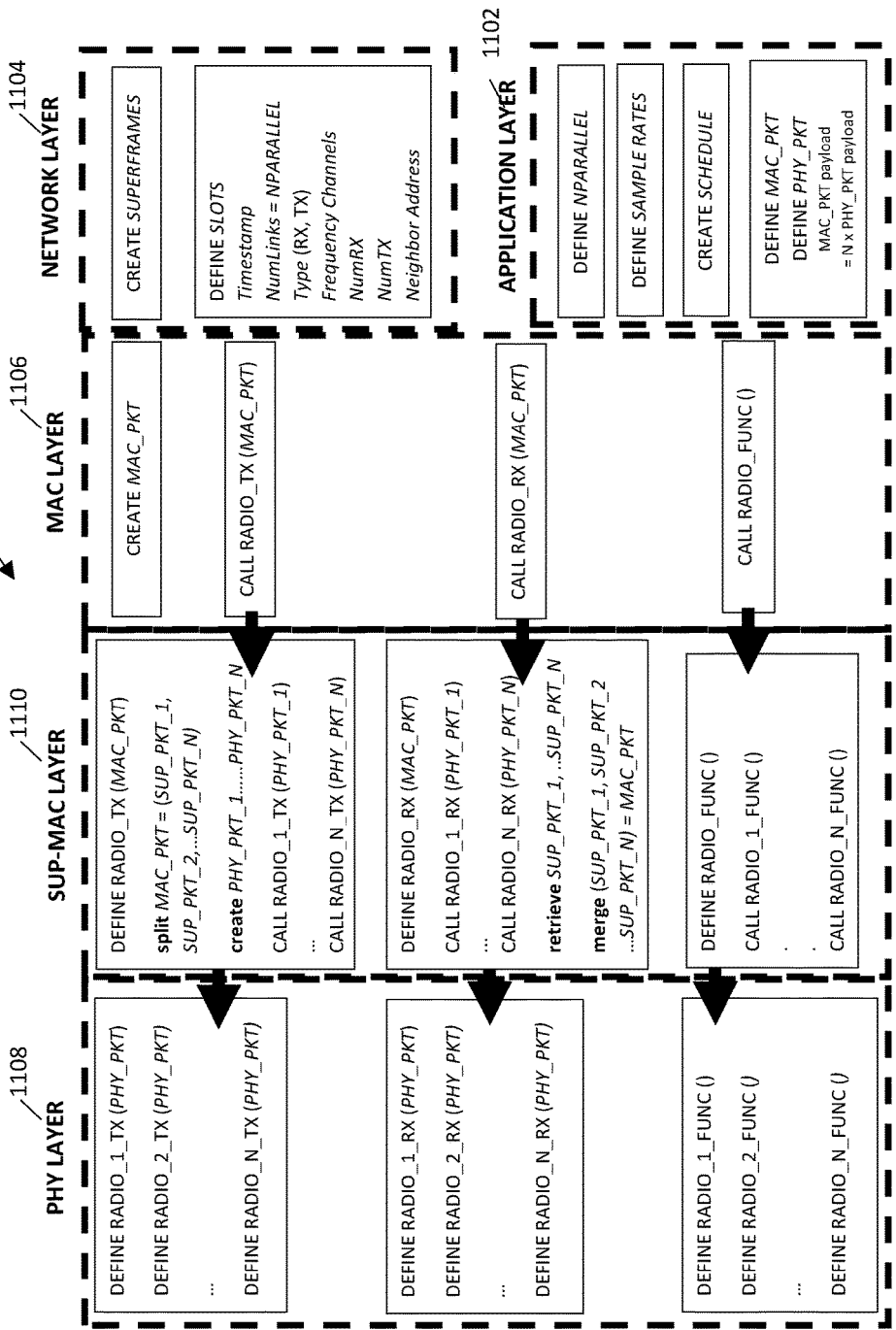
FIGS. 11a, 11b, and 11c show example software stacks for wireless communication over a WSAN.

FIG. 11a illustrates this software stack 1100. The software stack may also include an application layer 1102, networking layer 1104, media access layer (MAC layer) 1106, supplemental media access layer (SUP-MAC layer) 1110, and physical layer 1108. The layers may achieve the parallel transmission and reception of signals in the WSAN in accordance with embodiments.

The application layer 1102 may define general parameters associated with transmission and/or reception of signals by the devices on the WSAN. For example, the application layer of the gateway and/or other devices may allow a user to define a number of packets that might be transmitted and/or received in parallel in a time slot on the WSAN and/or a sample rate of a sensor device for sampling an operational parameter. Additionally, or alternatively, the application layer of the gateway and/or other devices (such as a basestation) may define a schedule which defines which devices are to transmit and/or receive which packets in each time slot for the WSAN. This schedule may be provided to devices in the WSAN. Still additionally, or alternatively, the application layer may define a format of a MAC packet (MAC_PKT) associated with the MAC layer, including a size of a payload. Compared to a conventional MAC_PKT, the MAC_PKT may have increased payload size, e.g., the MAC_PKT may carry more bits than a conventional MAC_PKT. The payload size of MAC_PKT may proportional to the number of parallel transmissions and/or receptions in a time slot. Note that while MAC_PKT may have increased payload size, it has the same width in time: a maximum data rate is increased to accommodate more data into the same time slot so as to maintain backwards compatibility.

Based on the schedule, the network layer 1104 may define a superframe representing node-to-node communications (receive and transmit) needed for data propagation from a source device to a destination device in a time slot. A superframe for each node may be derived from the schedule provided by the application layer or received from the gateway or other device. The network layer may also intermittently check health of all links in the network. If a link is lost or a new link is formed with a new device, it may update the schedule and superframe accordingly.

FIG. 12a illustrates an example schedule 1202 associated with the transmission and/or reception of packets over the WSAN. The schedule 1202 may define one or more time slots 1204 and one or more frequencies channels 1206, for transmission of packets by a device to achieve a desired level of reliability and/or throughput over the WSAN. The example schedule 1202 may also indicate a number of transmission or reception links associated with a frequency channel and whether the device is to transmit and/or receive packets in parallel. The example schedule 1202 may indicate that a packet associated with device A is to be transmitted on frequencies 1, 3, 5, 6 in slot 1 to devices B, C, and E and a packet associated with device B, C, E is to be transmitted on frequencies 6, 4, and 2 in slot 2 respectively. The example schedule 1202 may indicate that a packet associated with device A may be transmitted to the same receiving device E on frequencies 5, 6 in parallel in slot 1. Transmission of packets from a device on the same time slot but on multiple frequencies and to the same receiver device is called link bonding. Link bonding may provide improved reliability with electrical redundancy when physical redundancy is not available.

The example schedule 1202 may indicate that a packet is received on 4 receivers on frequency channel 6 by device G in slot 4. Reception of a packet by multiple receivers on the same frequency may be called receive diversity. Receive diversity may provide improved reliability with electrical redundancy where the same packet on same frequency is received.

The packets that are transmitted by a device in a same time slot may contain same data. In this regard, each packet may carry the same data. In other embodiments, the packets that are transmitted by a device in a same time slot may contain different data.

FIG. 12b illustrates an example superframe 1208. The example superframe 1208 may define transmissions and/or receptions of packets by devices in the WSAN. For example, the schedule may indicate that a packet associated with device A is to be transmitted on frequency channels 1, 3, 5, 6 in time slot 1 with one transmitter, device B is to receive a packet at time slot 1 over two receivers at frequency channel 1, and a packet associated with device B is to be transmitted at time slot 2 at frequency channel 6 with one transmitter. The schedule 1202 illustrates transmission and receptions associated with devices C-G in a similar manner.

Each row of the superframe may be referred to herein as a slot object. In this regard, the superframe 1208 may have a plurality of slot objects 1210, examples which are shown in rows 1 and 2 of the superframe 1208. Each slot object may identify for a timeslot, one or more of a timestamp which uniquely identifies timing of the time slot, a number of parallel links for transmission or reception of packets in the timeslot, a type of each of the parallel links (receive, transmit, etc.), a frequency to transmit and/or receive packets for each link, and/or a number of transmitters and receivers for each link. Separate slot objects may be defined for transmission and reception during a time slot. Other variations are also possible.

Referring back to FIG. 11*a*, the MAC layer 1106 may execute state machines to comply with the timing requirements associated with the schedule. A MAC_PKT may be defined by the the MAC layer 1106. The MAC_PKT may facilitate transmission of packet data in time slots in accordance with the schedule.

Figure 12C:
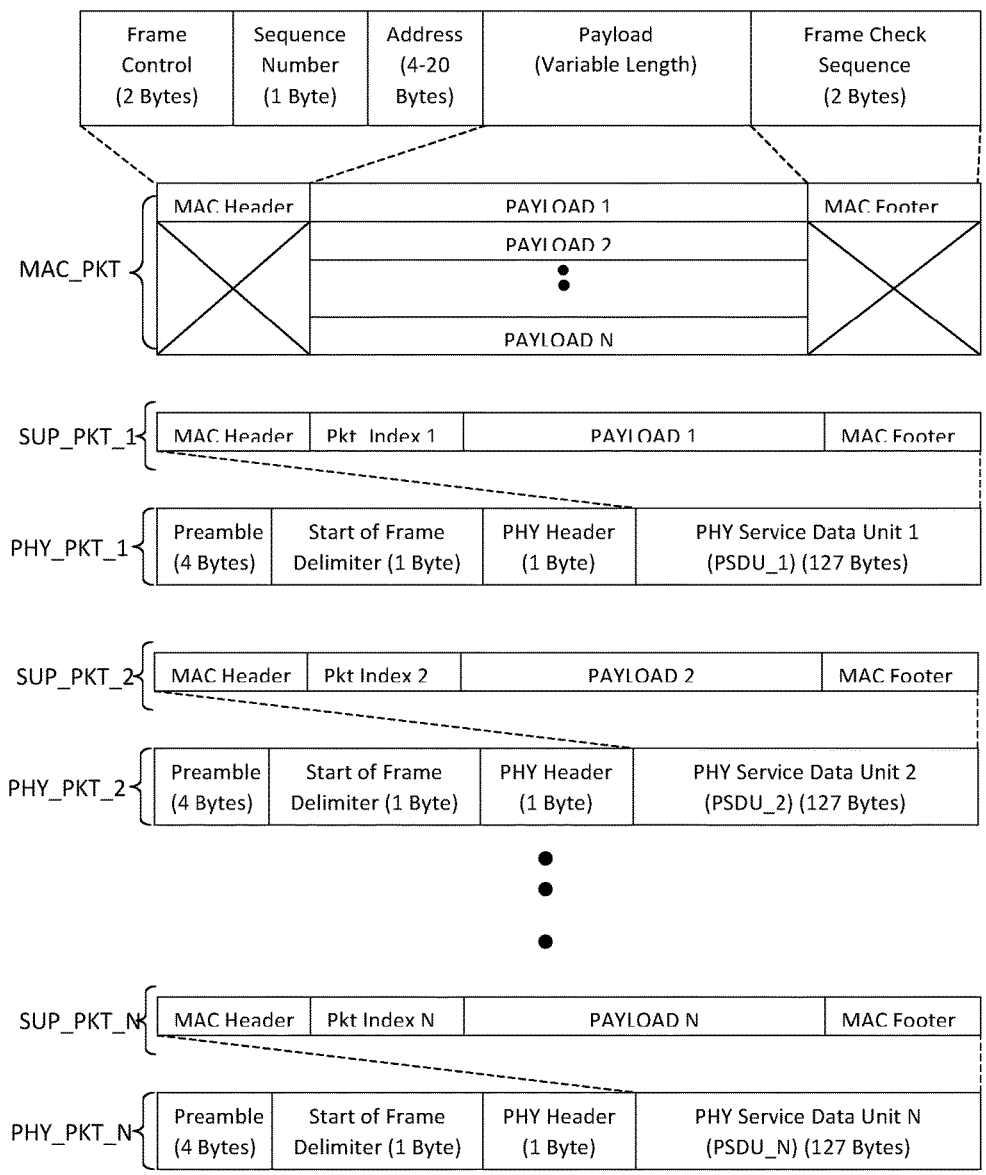
FIG. 12c shows an example of various packets associated with the WSAN.

FIG. 12*c* shows an example format of packets or frames (but not superframes) used in the WSAN. The packets may include a MAC_PKT, SUP_PKT, and PHY_PKT. A PHY_PKT may be based on a SUP_PKT and the SUP_PKT may be based on a MAC_PKT. Other variations are also possible.

The MAC_PKT may have a MAC header, a payload, and a MAC footer. The payload may be the data to transmit, for example, one or more data packets from a sensor. The payload may comprise one or more payloads 1-N, each of which is associated with one or more slot objects, and to be transmitted by a device in the WSAN. The payload may represent serial data generated by the sensor on a higher data-rate serial link so as to accommodate larger payload sizes within the time-slot boundary without adding latency. A number of bits in a payload of the media access layer packet may vary based on an amount of data generated by a sensor device in a time interval which is to be transmitted. The MAC header may comprise frame control (indicating the type of frame), sequence number (for identifying frames, e.g. in acknowledgements), addressing information (for source and destination) and security related information. The MAC footer may contain a frame check sequence that is calculated by the transmitter and used for frame validation by the receiver.

Referring again back to FIG. 11*a*, the MAC layer 1106 may provide the MAC_PKT to a SUP-MAC layer 1110. The SUP-MAC layer 1110 may be a layer added to the standard OSI. The MAC_PKT may have an indicator, e.g., at least one bit or flag. For example, the indicator may indicate that the MAC_PKT is to be split into N SUP_PKT. Based on this indicator, the SUP-MAC layer 1110 may use the MAC_PKT to generate multiple SUP_PKTs 1-N.

Figure 15:
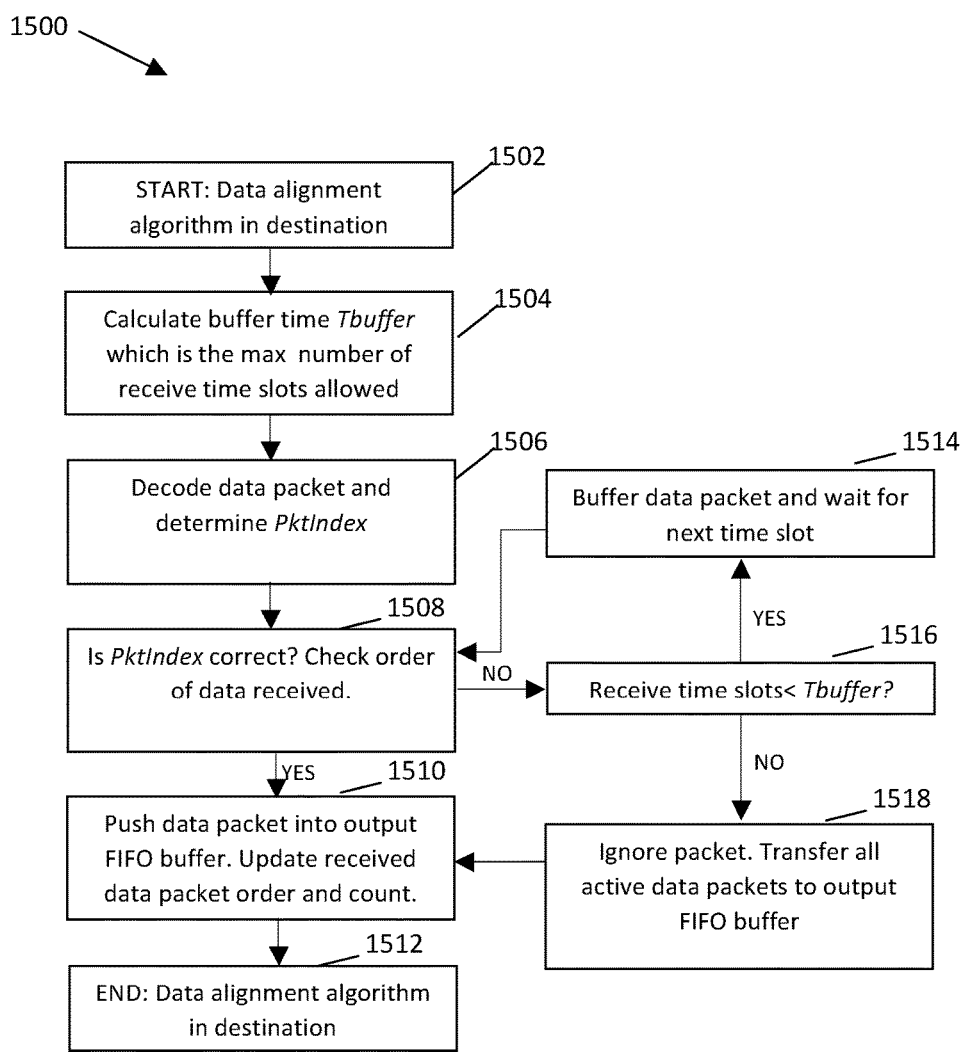
FIG. 15 shows a flow chart of functions associated with data alignment of packets received over a WSAN.

Referring again back to FIG. 12*c*, each SUP_PKT may have the MAC header and respective payload of the MAC_PKT. For example, SUP_PKT 1 may have payload 1 of the MAC_PKT. Similarly, SUP_PKT 2 may have payload 2 of the MAC_PKT. Further, each SUP_PKT may have an identifier such as a packet index which identifies one SUP_PKT from another. The packet index may be used by the destination receiver to align the packets in a coherent manner for accurate reconstruction of the payload. Packets transmitted on different parallel routes may arrive at the destination in a different order depending on number of retransmissions and hops on each route. FIG. 15 shows an example method of how packet index may be used for coherent data alignment and reconstruction.

The SUP-MAC layer 1110 may take a SUP_PKT and create a corresponding PHY_PKTs. For example, SUP_PKT 1 may be used to create PHY_PKT 1 which has payload 1 of the MAC_PKT. Similarly, PHY_PKT 2 may be used to create PHY_PKT 1 which has payload 2 of the MAC_PKT.

Referring back to FIG. 11*a*, the PHY_PKTs may be provided to the physical layer 1108 via a CALL function. The physical layer 1108 may comprise multiple radio modules defined by number of parallel transmissions/receptions, a modulation scheme, and similar low-level parameters. Via the CALL function, the payload of the MAC_PKT, via the PHY_PKTs, may be transmitted over one or more radios at one or more frequencies in one or more time slots in accordance with the schedule. Each PHY_PKT may be stored in transmit buffers of corresponding radio modules and wait for a transmit time slot to be available as indicated by the device schedule before initiating transmission. The device schedule may define transmit timeslots with number of parallel transmissions and frequencies of transmission. At times, the device schedule may be updated by the gateway. Upon availability of a transmit time slot, the PHY_PKTs may be retrieved from the corresponding buffer queues and transmitted over one or more antennas at one or more frequencies. The transmit buffer queues may be cleared once a successful acknowledgement is received from the receivers in each of the parallel links.

During a receive operation, a MAC_PKT may be used to generate PHY_PKTs 1-N. The CALL function may be used to receive data packets at one or more frequencies and timeslots in accordance with the device schedule. For example, upon availability of a receive time slot in the device schedule, the PHY_PKTs may be received over one or more antennas on one or more frequencies and stored in the corresponding receive buffers of the radio modules. When a CALL function is executed in the SUP-MAC layer, the PHY_PKTs may be retrieved from the corresponding buffer queues and corresponding fields of the PHY_PKTs are populated, including received data packets in PHY Service Data Units. The PHY_PKTs may be used to retrieve corresponding SUP_PKTs which are then merged into a single MAC_PKT which is then sent to the MAC layer. The payload 1-N of the MAC_PKT may have the different data packets received from a plurality of radios in accordance with the schedule. For example, PHY_PKT 1 may be used to retrieve SUP_PKT 1 which is then merged into the MAC_PKT. Payload 1 of the MAC_PKT may be the data packet associated with PHY_PKT 1. Other variations are also possible.

Figure 11B:
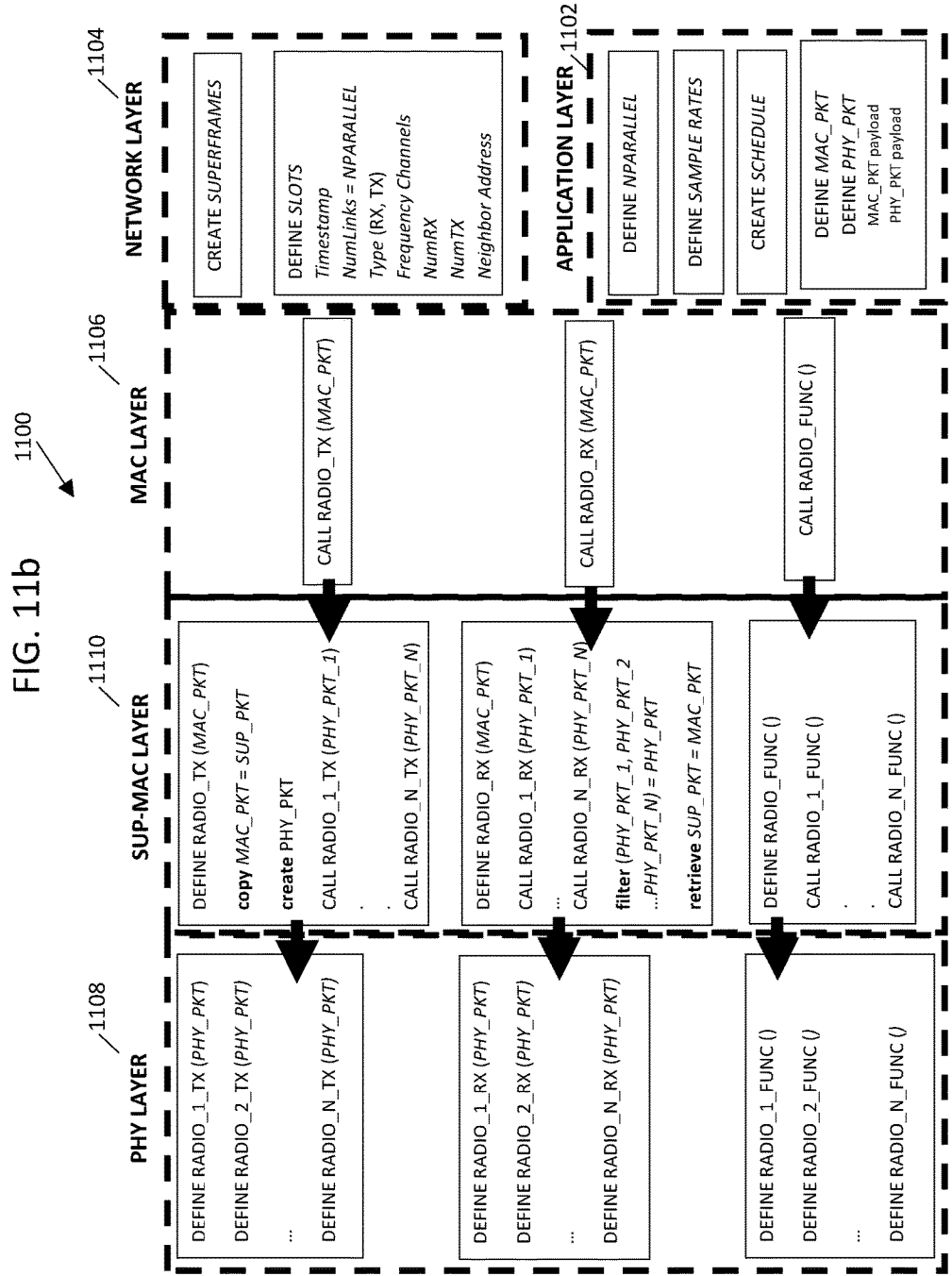

FIG. 11*b* illustrates another possible implementation of the OSI structure that can support parallelism while satisfying backward compatibility. A same data packet may be transmitted over multiple links in a time slot in accordance with one or more slot objects. The MAC_PKT may have a single payload which comprises a data packet. In this example, the MAC_PKT may not have increased payload size. The MAC_PKT may have an indicator. For example, the indicator may indicate that the SUP_PKT is to be used create a plurality of PHY_PKTs. Based on this indicator, the SUP-MAC layer 1110 may copy the MAC_PKT into a SUP_PKT. Based on the SUP_PKT, the SUP-MAC layer 110 may create a plurality of PHY_PKTs where each PHY_PKT may have a same payload. The PHY_PKTs may be passed to one or more radios via a function CALL. Via the CALL function, the PHY_PKT may be executed by the physical layer to transmit the data packet associated with the PHY_PKT via a radio module at the frequency and time slot, e.g., the same payload may be transmitted over one or more radios at one or more frequencies in the time slot. The schedule provided by the gateway or other device may be used to transmit the PHY_PKTs in an appropriate time slot and frequency.

Further, a device may receive multiple packets of the same data at one or more frequencies in accordance with the schedule, e.g., receive diversity. The CALL function may be used to receive data packets at one or more frequencies and timeslots in accordance with the schedule. For example, upon availability of a receive time slot in the device schedule, the PHY_PKTs are received over one or more antennas on one or more frequencies and stored in the corresponding receive buffers of the radio modules. The PHY_PKTs may be filtered by the SUP-MAC layer 1110 to identify and/or determine a most error-free version of the received PHY_PKTs. For example, PHY_PKT 3 and therefore associated data packet may have a least error. Alternatively, a combination of PHY_PKT1 and PHY_PKT3 may have a least error. This received PHY_PKT may then be used to retrieve a SUP_PKT which is formatted into MAC_PKT and passed onto the MAC layer 1106. The payload of the MAC_PKT may represent the data packet received over the radio as a result of receive diversity. Other arrangements are also possible.

Figure 11C:
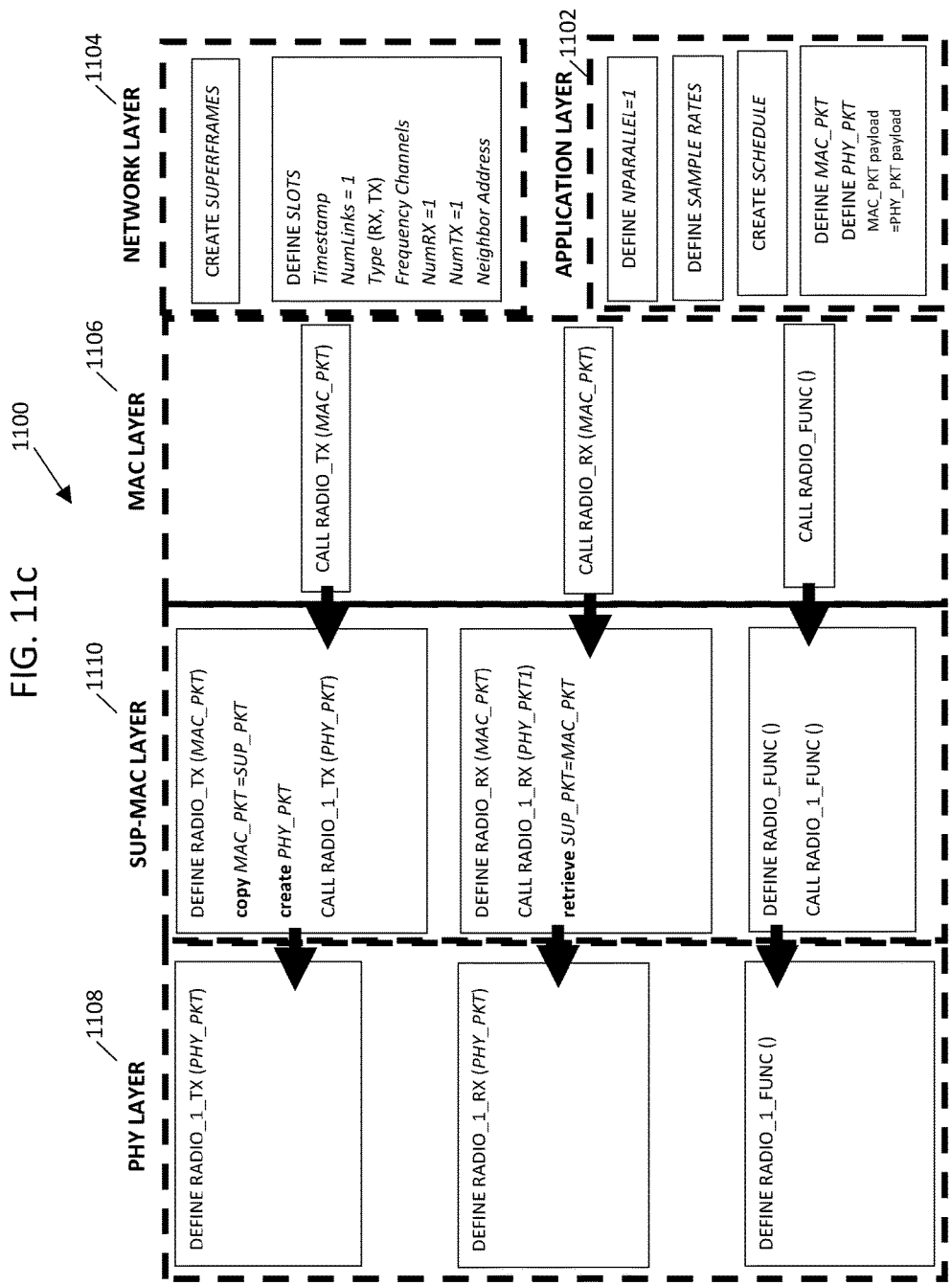

FIG. 11c shows that the SUP-MAC layer 1110 may be backward compatible to restore default functionality when no parallel transmissions and receptions is needed. The MAC_PKT may have an indicator which indicates that the MAC_PKT is not to be split and/or copied into a plurality of PHY_PKTs or a lack of an indicator. In this example, the MAC_PKT may not have increased payload size. The MAC_PKT may be copied to a SUP_PKT which is in turn used to create a single PHY_PKT. The PHY_PKT may be used to CALL a radio to transmit a data packet. The receive process may also operate based on a MAC_PKT which is used to CALL the radio. The received PHY_PKT may be used to retrieve a SUP_PKT, which is in turn used to retrieve a MAC_PKT passed to the MAC layer 1106. The MAC_PKT may have a received data packet.

Figure 13:
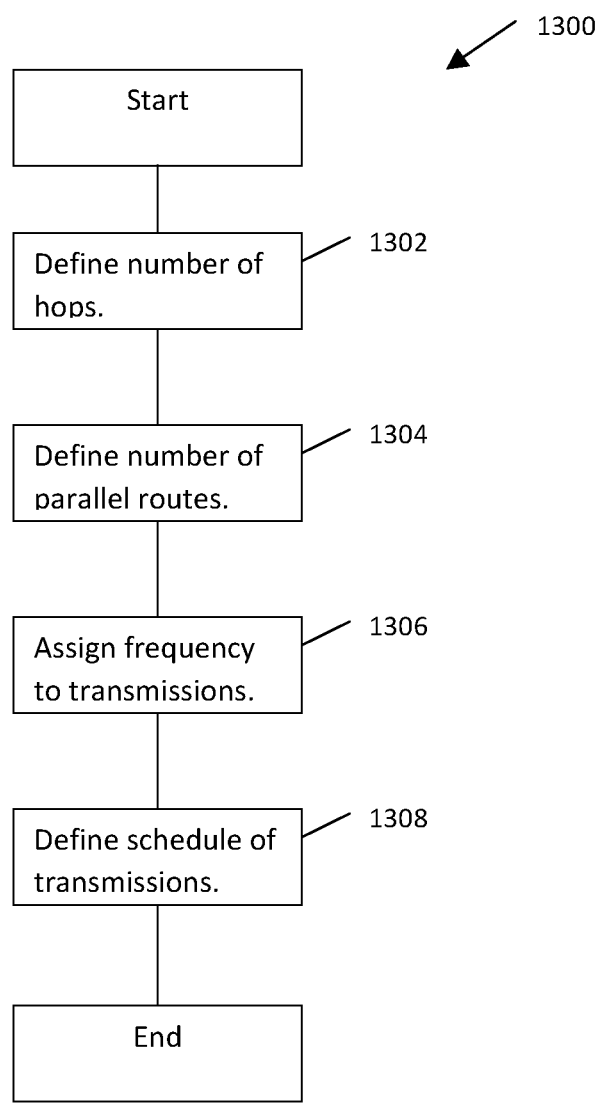
FIG. 13 shows a flow chart of functions associated with transmission of signals over a WSAN.

FIG. 13 shows a flow chart 1300 of functions associated with designing a WSAN topology with improved reliability. The WSAN topology may be designed with parallel routes from a source node to a destination node and transmission of packets based on spatial and frequency diversity. In some embodiments, the functions of flow chart 1300 may be performed by the gateway and/or distributed among devices in communication with the gateway.

The flow chart 1300 begins, at 1302, where a number of hops to satisfy a latency requirement may be determined. At 1304, a number of parallel routes (e.g., a number of redundant streams) to a device (also referred to herein as node) may be determined to satisfy a target bandwidth and/or reliability. The number of parallel routes may be based on certain node density. If the node density is insufficient to achieve a desired number of parallel routes, then link bonding may also be used to improve a reliability of transmission to a node. Link bonding may involve sending multiple streams of the same data to a same node so as to add redundancy and increase reliability of transmission of the data to the node. At 1306, a frequency may be assigned to each transmission from a source to a destination. At 1308, a schedule of transmissions may be defined. A device in the WSAN may be provided with this schedule or a portion thereof to achieve transmission in the WSAN over parallel routes with spatial and frequency diversity.

Figure 14A:
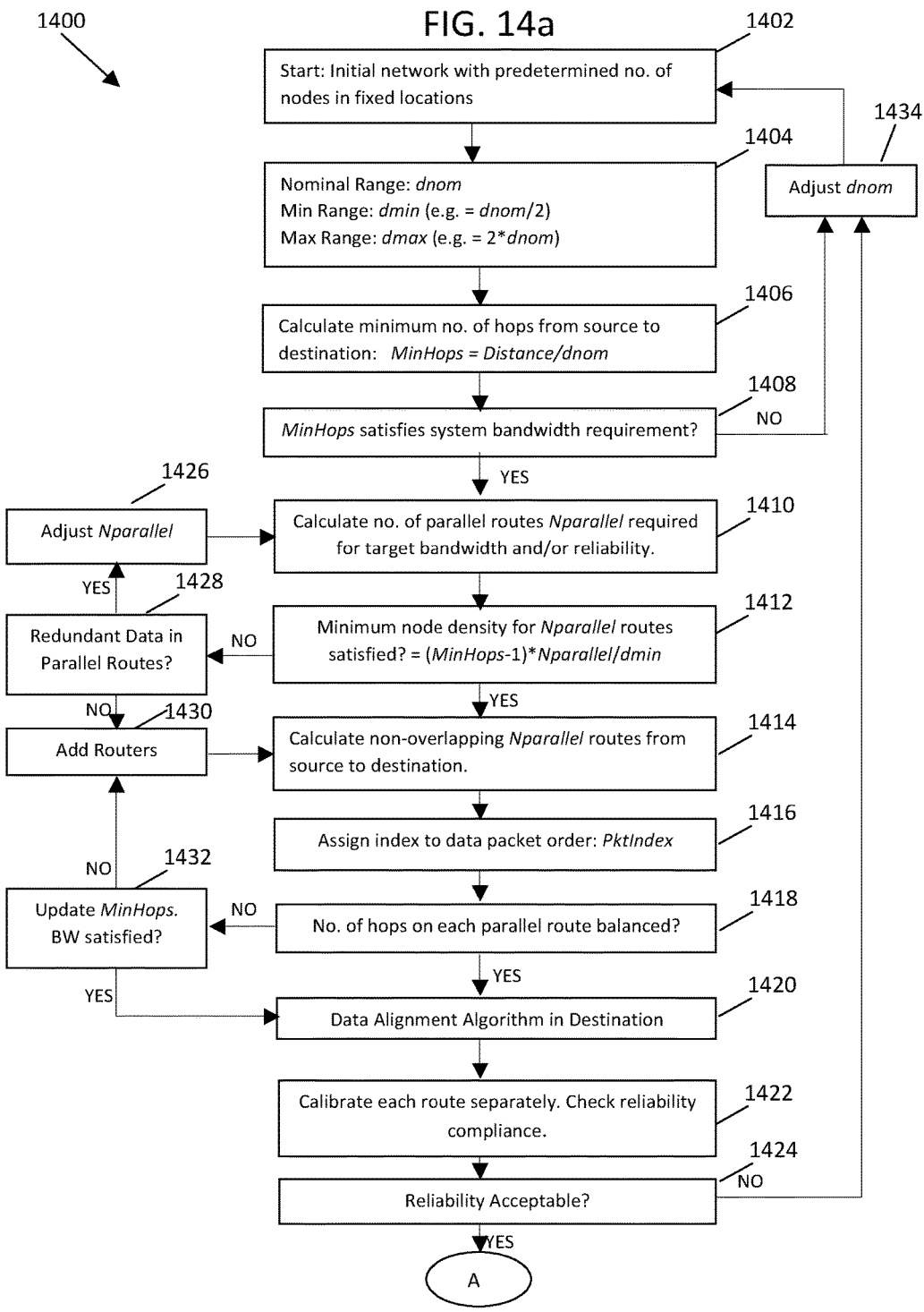
FIGS. 14a and 14b show a more detailed flow chart of functions associated with transmission and/or reception of signals over a WSAN.
Figure 14B:
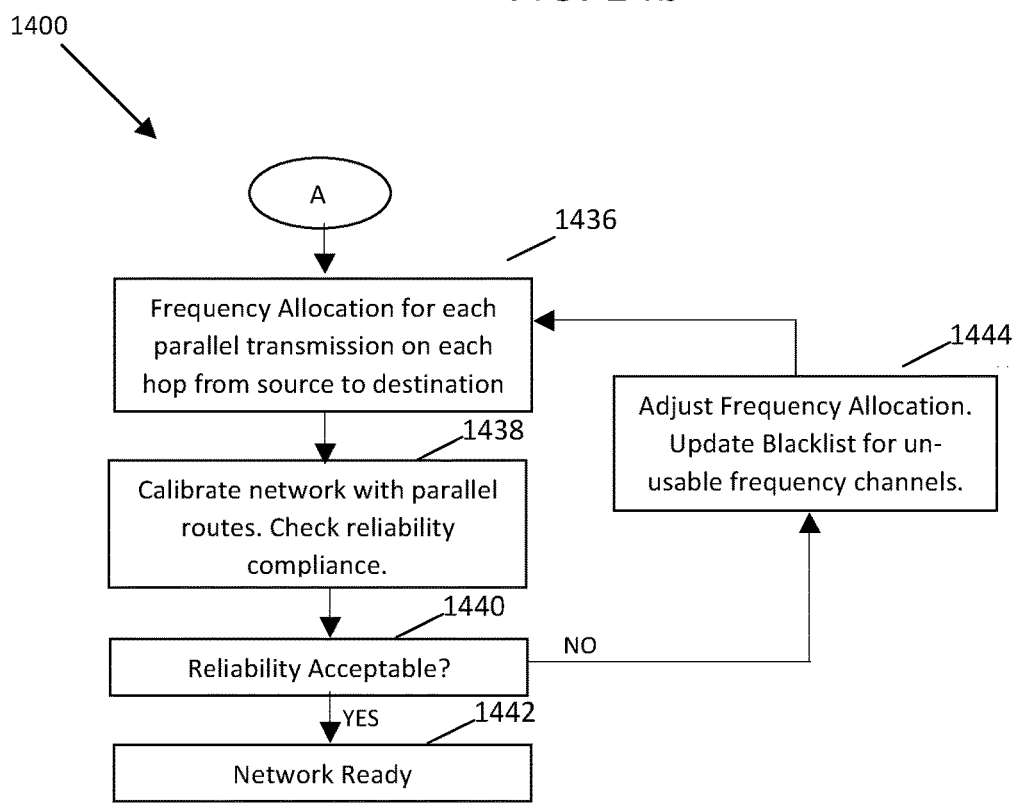

FIGS. 14a and 14b show a more detailed flow chart 1400 of functions associated with designing a WSAN topology for transmitting signals (e.g., data, data streams, packets) in parallel over one or more frequencies (e.g., channels, frequency channels) in one or more time slots.

At 1402, an initial network topology may be defined. The topology may define locations of one or more of the sensors, routers, gateway, and actuators, e.g., devices, of the WSAN. In some cases, locations of the sensors and actuators may be based on proximity to operational parameters to be monitored or controlled.

At 1404, one or more of a nominal, max and min transmission and/or reception range (dnom, dmin, dmax) of the devices may be determined. The range may be measured in units of distance e.g. meters, which may be a function of the transmit output power, receive sensitivity and antenna gain for a given modulation scheme. In some embodiments, the devices may have several transmit and receive modes to provide scalability in transmission range with trade-offs in power consumption. One or more these modes may be considered in determining the nominal, max and min transmission and/or reception range.

Bandwidth or latency of the network may be a function of a number of hops required for data propagation from source to destination. The hops may be more than the number of nodes between the source to destination due to retransmission.

At 1406, a minimum number of hops MinHops from a source to a destination may be calculated. The minimum number of hops may be a function of the distance between source and destination divided by the nominal range dnom. The transmitter's range (dnom, dmin and dmax) may be adjusted at 1434 until MinHops satisfies the bandwidth requirement at 1408.

At 1410, a number of parallel routes Nparallel may be determined to satisfy bandwidth and/or reliability requirements. The network's node density (in units of number of nodes/meter) may support Nparallel non-overlapping routes from source to destination. Node density requirement may be calculated as (MinHops−1)*Nparallel/dmin. If at 1412, the node density requirement is not met, and at 1428, redundant data (e.g., same operational parameter for an asset) exists in parallel routes, then Nparallel may need to be adjusted at 1426. If at 1412, the node density requirement is not met, and at 1428, redundant data does not exist in parallel routes, then additional router devices may be installed at 1430. In some embodiments, if redundant data exist in parallel routes, the parallel routes may promote link bonding. Once node density requirement is satisfied, at 1414, Nparallel non-overlapping routes may be determined from a source to a destination. The non-overlapping routes may include transmissions to different destinations where a transmission to one destination does not not overlap with a transmission to another destination. The transmissions may be achieved in a directional manner such as with directional antennas or signal processing.

Data from the source may be divided into Nparallel parts and propagated over Nparallel non-overlapping routes to the destination where the data is combined in a coherent manner to resemble the original transmitted data. At 1416, an index, PktIndex, representing data order may be assigned to each of the Nparallel data packets and encoded into the data. At 1418, a difference in the delays between un-balanced routes (number of hops may be different in the parallel routes) may be minimized to meet the bandwidth requirement by balancing the number of hops in the parallel routes with installation of additional routers.

At 1420, a data alignment algorithm is chosen. The data alignment algorithm may define how data packets from a plurality of channels associated with one or more time slots are combined and aligned at a destination.

FIG. 15 shows an example methodology 1500 to combine and align data packets at the destination. At 1502, data alignment may start. At 1504, a maximum buffer time, Tbuffer, may be defined which represents the maximum number of allowed receive time slots for all data packets to arrive at the destination. At 1506, a PktIndex may be decoded from the received data which is sequentially stored in an output FIFO buffer in the right order. At 1508, a determination may be made as to whether the data packet is in the right order.

If the the order is correct, then at 1510 the data packet may be pushed to an output FIFO buffer and the data alignment ends 1512. If the order is not correct, and at 1516, a number of receive time slots Treceive is less than Tbuffer, then at 1514 the data may continue to be buffered for a next time slot. If the order is not correct and a number of receive time slots Treceive is greater than Tbuffer, then at 1518, the packet may be ignored and remaining packets may be transferred to output FIFO buffer in corresponding order of PktIndex.

Consider the following illustration. A sensor may be configured to divide serial data with size equal to four packets with index order pkt1, pkt2, pkt3, pkt4 into four parallel data packets routed over four parallel routes in a mesh network to a gateway. The designed routing scheme may be such that pkt2 and pkt3 need 3 hops or time slots under normal operation while pkt1 and pkt4 need 4 hops or time slots under normal operation. In this case, Tbuffer may be chosen equivalent to 2 time slots which may be conservatively extended to 3 time slots if allowed by bandwidth requirements. The gateway may receive pkt2 and pkt3 in the first receive time slot and buffered separately to wait for the arrival of pkt1 before being sent to the output FIFO buffer. In this example, for unforeseen reasons, only pkt4 may arrive in the next time slot which is also buffered separately with pkt2 and pkt3. If pkt1 arrives in the third time slot, it is stored in the FIFO buffer first followed by pkt2, pkt3 and pkt4. If pkt1 does not arrive in the third time slot which is equal to Tbuffer, it is ignored and only pkt2, pkt3 and pkt4 are transferred to the output FIFO buffer.

Referring back to FIG. 14, at 1422, each route may be calibrated by sending test data from source to destination once the non-overlapping parallel routes are determined and the required number of additional routers are installed. If the reliability requirement at 1424 is not satisfied for any of the routes, insufficient range may exist and at 1434 dnom may need to be adjusted.

At 1436, a unique frequency channel may be assigned to each parallel transmission of a packet and at each hop for a packet. Assigning different frequency channels to the parallel routes may minimize packet-to-packet interference. Assigning different frequency channels to each hop may minimize probability of signal outage due to external interference.

Figure 16:
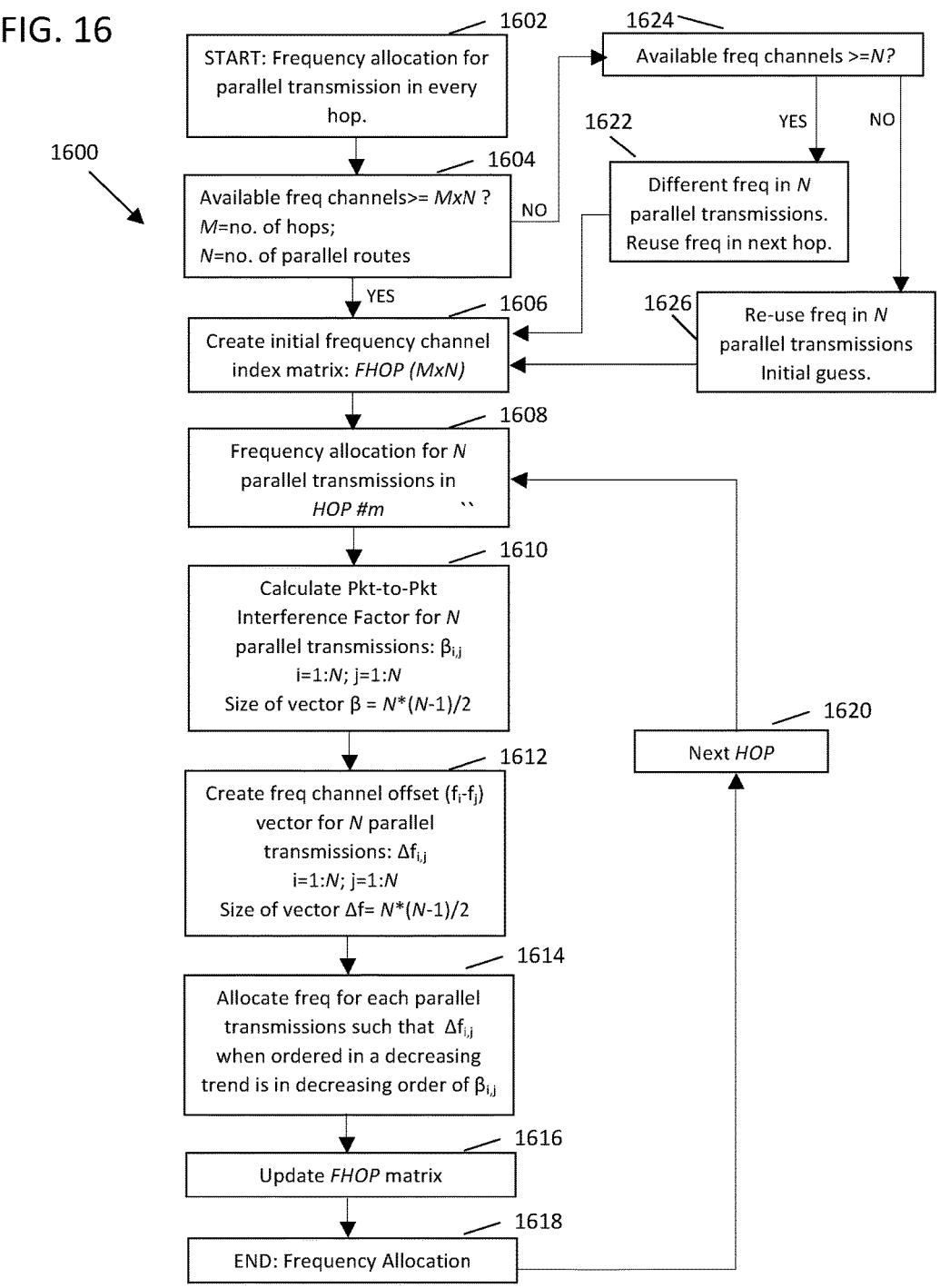
FIG. 16 shows a flow chart of functions associated with frequency allocation associated with signal transmission over a WSAN.

FIG. 16 show a flow chart 1600 associated with functions for frequency allocation for transmission for every hop in accordance with embodiments. Frequencies, e.g., frequency channels, may be allocated in a manner so that interference between transmissions meets predefined criteria.

At 1602, frequency allocation may start. At 1604, a determination is made whether an available number of frequency channels is greater than M×N where M is a number of hops and N is a number of parallel routed in the WSM. The wireless standard IEEE 802.15.4, a commonly used mode of communication, may define in the ISM a 2.4 GHz-2.48 GHz band consisting of 16 channels with channel bandwidth of 3 MHz and channel spacing of 5 MHz. If the available number of frequency channels is greater than M×N, then at 1606 a channel matrix may be defined where each stream as well as each hop may be assigned a unique frequency.

Consider the example where four data streams may be transmitted with four hops to the destination assuming all 16 channels are available. In this case, each stream transmitted in a time slot may be assigned a unique frequency and the initial frequency allocation matrix may be represented as shown below by the following channel index matrix:

$$\begin{array}{c} \phantom{Hop\#1} \quad Strm\#1 \quad Strm\#2 \quad Strm\#3 \quad Strm\#4 \\ \begin{array}{c} Hop\#1 \\ Hop\#2 \\ Hop\#3 \\ Hop\#4 \end{array} \begin{bmatrix} f1 & f5 & f9 & f13 \\ f2 & f6 & f10 & f14 \\ f3 & f7 & f11 & f15 \\ f4 & f8 & f12 & f16 \end{bmatrix} \end{array}$$

In some embodiments, presence of other wireless sources in the environment such as 802.11b/g may render some channels un-usable and reduce the number of available channels. Also, spacing between frequency channels of transmissions of packets in a same time slot may determine a magnitude of packet-to-packet interference. For example, a wider spacing in frequency may allow more rejection of the undesired packet by the filters described with respect to FIG. 7-10.

If the available number of frequency channels is not greater than M×N, then each stream for each hop may not be assigned a unique frequency. At 1624, a determination is made whether the available frequency channels are greater than or equal to N. If the available number of frequencies is less than N, then at 1626 different frequencies may be reused in a same time slot. If the available number of frequencies is greater than N, then at 1622 different frequencies may be used and reused in different time slots.

For example, co-existence with other wireless sources in the ISM band such as 802.11g may result in 802.15.4 frequency channels that overlap with 802.11 channels being unusable. Frequencies may need to be reused. If four channels that are available: f5, f10, f15, f16, then the initial frequency allocation matrix may reduce to:

$$\begin{array}{c} \phantom{Hop\#1} \quad Strm\#1 \quad Strm\#2 \quad Strm\#3 \quad Strm\#4 \\ \begin{array}{c} Hop\#1 \\ Hop\#2 \\ Hop\#3 \\ Hop\#4 \end{array} \begin{bmatrix} f5 & f10 & f15 & f16 \\ f5 & f10 & f15 & f16 \\ f16 & f15 & f10 & f5 \\ f16 & f15 & f10 & f5 \end{bmatrix} \end{array}$$

Since four frequency channels are available, unique frequencies may be assigned to the four streams in each hop. Frequency may be reused in consecutive hops in the same order for the streams or a different order if data pipelining is needed for further bandwidth extension. In data pipelining consecutive hops occur in the same time slot and frequency spacing between hops needs to be chosen accordingly to minimize packet-to-packet interference. In the above example, Hop#1 and Hop#3 may occur in the same time-slot and Hop#2 and Hop#4 may occur in another time slot.

At 1608, the frequency channels are allocated based on the frequency allocation matrix. At 1610, a desired frequency spacing between transmissions in a same time slot can be determined by calculating the packet-to-packet interference factor β. The frequency spacing between the two packets may need to be higher for a higher f3 to get maximum possible rejection from a receiver's channel filters and/or additional bandpass or notch filters.

Figure 17:
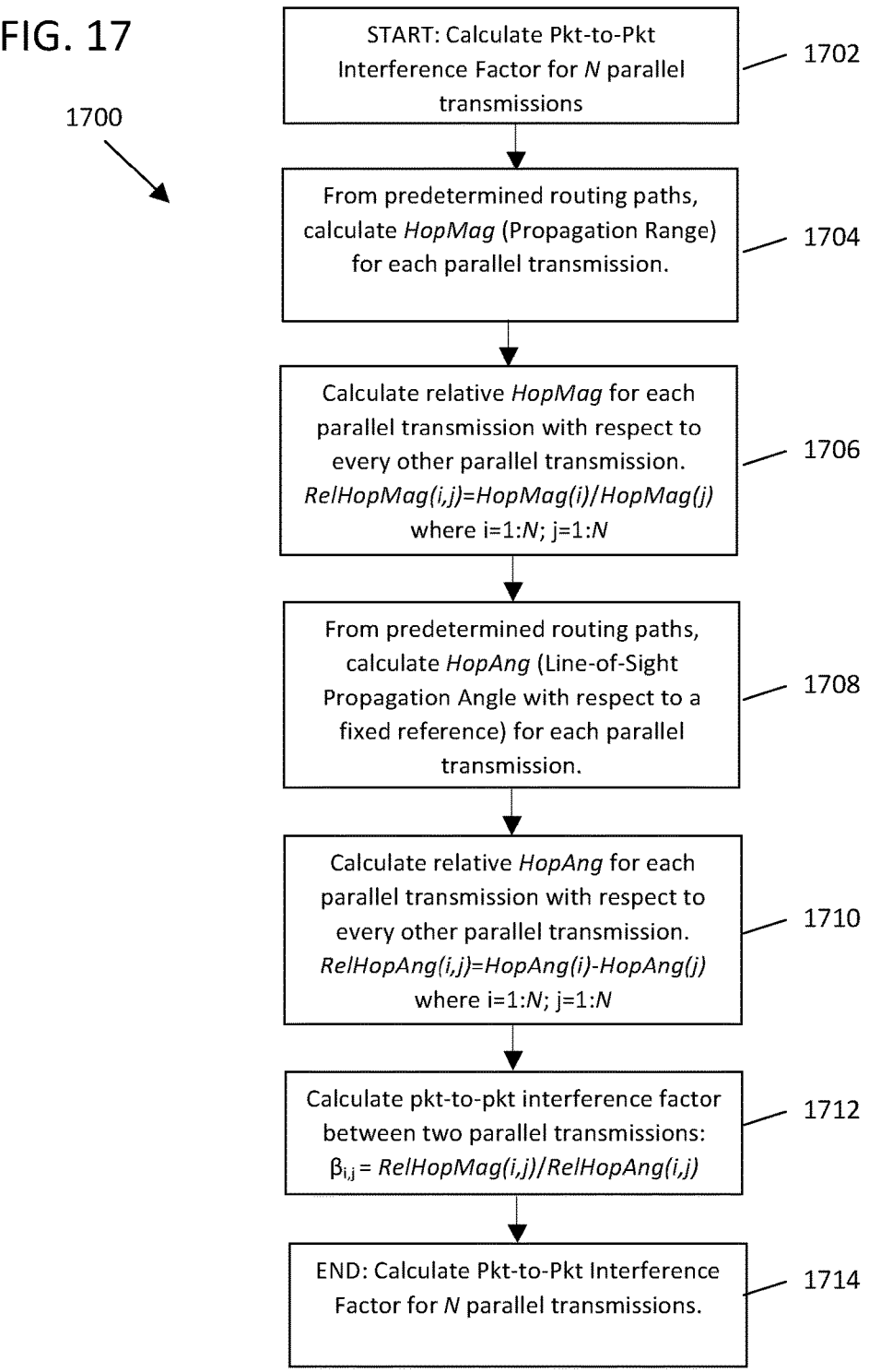
FIG. 17 shows a flow chart of functions associated with determining packet to packet interference over a WSAN.

FIG. 17 shows a flow diagram 1700 of functions associated with determining packet-to-packet interference. The packet-to-packet interference factor β may based on a ratio of power levels of an undesired packet to desired packet at a receiver input of a device on the WSAN where each packet is transmitted on different frequencies.

At 1702, a calculation of the packet-packet interference may start. Parallel routes, e.g., packets transmitted in a same time slot, may require different transmission ranges or Hop Mag.

At 1704, a propagation range Hop Mag may be calculated from a predetermined routing paths. The Hop Mag may quantify a proximity associated with transmission of the packet from a source to a destination. The proximity may be measured in terms of transmit power, for example.

At 1706, a relative Hop Mag may be determined for each parallel transmission with respect to every other parallel transmission in a time slot. The relative Hop Mag may be a difference in the power levels of the two packets at the receiver input which is a direct function of the corresponding transmission power specified for each packet at the transmitter.

At 1708, from the predetermined routing path, a HopAng line of sight propagation angle from the device that transmits the packet to the device that receives the packet may be determined for each parallel transmission in a time slot. The transmission to a destination may be oriented in a direction toward the destination. Moreover, since the parallel routes may be non-overlapping, an angle of transmission with respect to the axis of propagation or Hop Ang may be different for each data stream transmitted from the same device. The proximity between two packets transmitted in parallel may be a direct function of the corresponding angles of transmission with respect to the propagation axis which may be along one of the three dimensions in space. The transmission may be a directional transmission achieved in various ways, including using directional antennas or signal processing, among other schemes.

At 1710, a relative HopAng may be determined for each parallel transmission with respect to every other parallel transmission.

At 1712, a packet to packet interference factor β may be determined. The packet-to-packet interference factor β between any two parallel transmissions may be a function of the ratio of the corresponding HopMag and difference between the corresponding HopAng. Frequency spacing may be widest between two parallel transmissions with the highest β. Hence, frequency allocation for parallel transmissions can be based on β between parallel transmissions. Processing may end at 1714.

Referring back to FIG. 16, at 1612, a frequency channel offset vector may be calculated for N parallel transmissions based on the allocated frequencies at 1608. Each entry in the channel offset vector may indicate a difference in frequency offset between different combinations of two signals transmitted in a same time slot. Then, at 1614, frequency channels may be re-allocated such that spacing between frequency between any two parallel transmissions follow the same order of β. At 1616, the frequency allocation matrix may be updated. A schedule may be defined by the frequency allocation matrix and provided to the devices on the WSAN. At 1618, processing may end.

FIG. 18a-d illustrates an example reallocation of frequency channels in accordance with FIGS. 16 and 17.

Figure 18A:
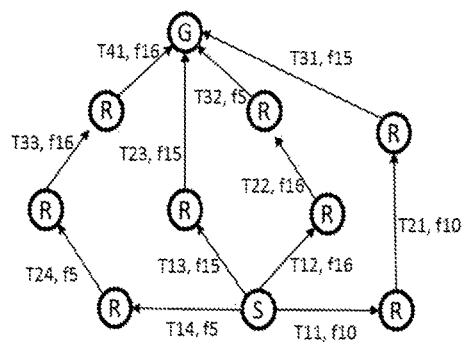
FIGS. 18a, 18b, 18c, and 18d show example reallocations of frequency spacing associated with signal transmission and/or reception over a WSAN.

FIG. 18a shows an example of a WSAN transmitting four data streams on parallel routes with a maximum of four hops and reallocation of the frequency spacing. Every hop may be identified by a fixed time-slot for transmission of one of the parallel data streams on an initially allocated frequency channel. For example, the hop labeled by (T14, f5) may indicate transmission of data stream #4 on time slot #1 and frequency channel f5.

Figure 18B:
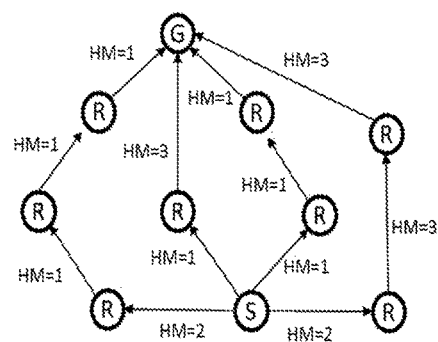

FIG. 18b shows a magnitude of the transmission range (normalized for simple illustration) or HopMag (HM) for each hop.

Figure 18C:
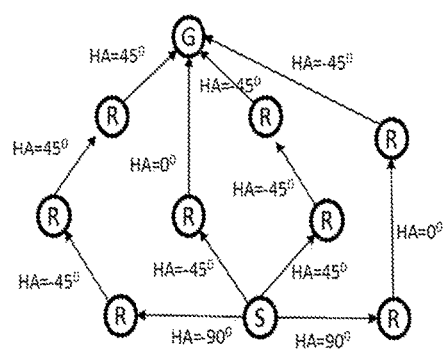

FIG. 18c shows an angle of transmission with respect to the axis of propagation (which in this case is a vertical line) or HopAng (HA). The relative HopMag ($\Delta$HM) for each parallel transmission with respect to every other parallel transmission may be calculated for each hop as $\Delta HM(i,j) = HM(i)/HM(j)$ where i and j represent different streams.

|  | $\Delta HM12$ | $\Delta HM13$ | $\Delta HM14$ | $\Delta HM23$ | $\Delta HM24$ | $\Delta HM34$ |
|---|---|---|---|---|---|---|
| Hop#1 | 2 | 2 | 1 | 1 | 2 | 2 |
| Hop#2 | 3 | 1 | 3 | 3 | 1 | 3 |
| Hop#3 | 3 | 3 | — | 1 | — | — |
| Hop#4 | — | — | — | — | — | — |

The relative HopAng ($\Delta$HA) for each parallel transmission with respect to every other parallel transmission may be calculated as $\Delta HA(i,j) = HA(i) - HA(j)$. For simplicity of illustration a normalized HopAng in units of radians is used: $\Delta HA(Normalized) = \Delta HA(radians)/\pi$ where, $\Delta HA(radians) = \pi - (2\pi/360)*HA(degree)$.

|  | $\Delta HA12$ | $\Delta HA13$ | $\Delta HA14$ | $\Delta HA23$ | $\Delta HA4$ | $\Delta HA34$ |
|---|---|---|---|---|---|---|
| Hop#1 | 5/4 | 7/4 | 2 | 3/2 | 7/4 | 5/4 |
| Hop#2 | 5/4 | 1 | 5/4 | 3/4 | 1 | 5/4 |
| Hop#3 | 1 | 1/2 | — | 1 | — | — |
| Hop#4 | — | — | — | — | — | — |

The packet-to-packet interference factor between any two parallel transmissions for each hop may be calculated as $\beta(i,j) = \Delta HM(i,j)/\Delta HA(i,j)$.

|  | $\beta 12$ | $\beta 13$ | $\beta 14$ | $\beta 23$ | $\beta 24$ | $\beta 34$ |
|---|---|---|---|---|---|---|
| Hop#1 | 8/5 | 8/7 | 1/2 | 2/3 | 8/7 | 8/5 |
| Hop#2 | 12/5 | 1 | 12/5 | 12/3 | 1 | 12/5 |
| Hop#3 | 3 | 6 | — | 2 | — | — |
| Hop#4 | — | — | — | — | — | — |

Arranging β in decreasing order of magnitude for each hop:

Hop#1: β12, β34 >β13, β24>β23>β14
Hop#2: β23>β12, β14, β34>β13, β24
Hop#3: β13>β12>β23

Frequency channels may be re-allocated such that spacing between frequency between any two parallel transmissions follow the same order of β shown above. In some cases, number of available frequency channels may be less than the number of parallel transmissions. In such cases, priority of frequency reuse for parallel transmissions may be determined by the corresponding β factor.

Figure 18D:
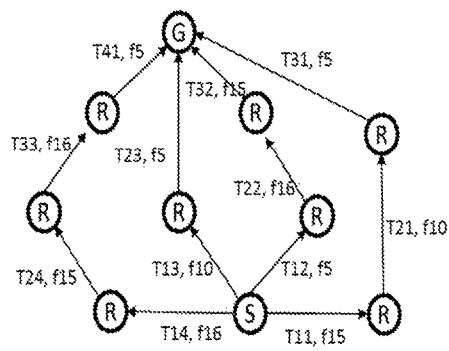

FIG. 18d shows the re-allocated frequencies for the example. The available frequency channels offsets in this example are 1 (f16-f15), 5 (f15-f10), 5(f10-f5), 6 (f16-f10), 10 (f15-f5) and 11 (f16-f5). The offset may be calculated in this example as the difference between frequency channels, e.g., f16 to f15 is 1 offset and f15 to f10 is five offset. In Hop#1, [T11, T14] has the lowest β and therefore, frequency channels for these parallel streams can be 1(f16-f15). [T12, T13] has the next lowest β and therefore frequency channel offsets of 5 (f15-f10) may be a good choice. Similarly, for the next lowest β, [T11, T13] and [T12, T14] frequency channel offsets of greater than 5 (f10-f5) and (f16-f10) may be good choices. [T11, T12] and [T13, T14] have the highest β and the highest available frequency channel offsets 10(f15-f5) and 11(f16-f5). may be used. After a few iterations, the best frequency allocation may converge to the pattern shown in FIG. 18d. A similar exercise can be performed for all the hops.

Referring back to FIG. 14b, at 1438, the WSAN may be calibrated by sending test data from the source to destination on the determined parallel routes and assigned frequencies. If the reliability requirement is not satisfied at 1430, then the frequency allocation may be further adjusted at 1444. Otherwise, at 1442, the WSAN may be ready for transmission and/or reception of signals in accordance with the illustrated topology.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. In a wireless sensor actuator network, a method comprising:
   determining a time slot for transmission of a signal to a first device and a second device in the wireless sensor actuator network, wherein the first device is different from the second device; and
   during the time slot, transmitting in parallel the signal (i) via a first frequency channel and first antenna to the first device and (ii) via a second frequency channel and second antenna to the second device;
   wherein the first frequency channel is different from the second frequency channel; and
   wherein the first frequency channel and the second frequency channel are selected based on a power level to transmit the signal to the first device, a power level to transmit the signal to the second device, an angle to transmit the signal to the first device, and an angle to transmit the signal to the second device.

2. The method of claim 1, wherein the time slot is a first time slot and the signal is a first signal, the method further comprising:
   determining a second time slot which follows the first time slot in time for transmission of a second signal to a third device and a fourth device in the wireless sensor actuator network; and
   during the second time slot, transmitting in parallel the second signal (i) via a third frequency channel and third antenna to the third device and (ii) via a fourth frequency channel and fourth antenna to the fourth device;
   wherein the third frequency channel and fourth frequency channel are different from the first frequency and the second frequency channel.

3. The method of claim 1, wherein the signal is a data packet, the method further comprising generating, by a sensor device, the data packet.

4. The method of claim 1, wherein transmitting in parallel the signal (i) via a first frequency channel and first antenna to the first device and (ii) via a second frequency channel and second antenna to the second device in parallel, comprises:
   receiving a media access layer packet;
   based on an indication in the media access layer packet, creating a first physical layer packet and the second physical layer packet based on the media access layer packet; and
   providing the first physical layer packet and the second physical layer packet to respective radios for respective transmission of the signal to the first device and the second device.

5. The method of claim 4, wherein a number of bits in a payload of the media access layer packet varies based on an amount of data generated by a sensor device in a time interval.

6. The method of claim 1, further comprising receiving a schedule from a gateway of the wireless sensor actuator network, wherein the schedule identifies the time slot, the first frequency channel and the second frequency channel for transmission of the first signal and second signal respectively.

7. The method of claim 1, wherein the first frequency channel and second frequency channel each define non-overlapping ranges of frequencies.

8. The method of claim 1, wherein the signal is a first signal, the method further comprising receiving (i) a second signal at a third frequency and third antenna and (ii) a third signal at a fourth frequency and fourth antenna in parallel with transmitting the first signal to the first device and the second device.

9. The method of claim 8, wherein receiving the second signal at the third frequency and third antenna comprises applying a notch filter to the second signal to reject frequencies associated with the third signal that interfere with the second signal.

10. The method of claim 1, further comprising receiving a schedule from a gateway of the wireless sensor actuator network, wherein the schedule identifies a number of transmissions in the time slot, wherein the number of transmissions is greater than or equal to two.

11. In a wireless sensor actuator network, a device comprising:
    a first module configured to determine a time slot for transmission of a signal to a first device and a second device in the wireless sensor actuator network, wherein the first device is different from the second device; and
    a second module configured to transmit the signal in parallel (i) via a first frequency channel and first antenna to the first device and (ii) via a second frequency channel and second antenna to the second device, wherein the signal is transmitted during the time slot;
    wherein the first frequency channel is different from the second frequency channel; and
    wherein the first frequency channel and the second frequency channel are selected based on a power level to transmit the signal to the first device, a power level to transmit the signal to the second device, an angle to transmit the signal to the first device, and an angle to transmit the signal to the second device.

12. The device of claim 11, wherein transmitting the signal (i) via a first frequency channel and first antenna to the first device and (ii) via a second frequency channel and second antenna to the second device in parallel comprises:
    receiving a media access layer packet;
    based on an indication in the media access layer packet, creating a first physical layer packet and the second physical layer packet based on the media access layer packet; and
    providing the first physical layer packet and the second physical layer packet to respective radios for respective transmission of the signal to the first device and the second device.

13. The device of claim 11, further comprising a third module to receive a schedule from a gateway of the wireless sensor actuator network, wherein the schedule indicates the time slot, the first frequency channel and the second frequency channel for transmission of the first signal and second signal respectively.

14. The device of claim 11, wherein the first frequency channel and second frequency channel each define non-overlapping ranges of frequencies.

15. The device of claim 11, wherein the signal is a data packet.

16. In a wireless sensor actuator network, a method comprising:
    determining, by a device, a time slot for receiving a first signal and a second signal transmitted in the wireless sensor actuator network;
    during the time slot, receiving in parallel, by the device, (i) the first signal via a first frequency channel and first antenna of the device and (ii) the second signal via a second frequency channel and second antenna;
    wherein the first frequency channel is different from the second frequency channel; and
    wherein the first frequency channel and the second frequency channel are selected based on a power level to transmit the first signal to the device, a power level to transmit the second signal to the device, an angle to transmit the first signal to the device, and an angle to transmit the second signal to the device.

17. The method of claim 16, wherein receiving in parallel (i) the first signal via a first frequency channel and first antenna of the device and (ii) the second signal via a second frequency channel and second antenna of the device comprises receiving in parallel (i) a first packet over a first frequency channel and first antenna and (ii) a second packet over a second frequency channel and second antenna.

18. The method of claim 16, wherein receiving in parallel (i) the first signal over a first frequency channel and first antenna of the device and (ii) the second signal over a second frequency channel and second antenna comprises receiving a first physical layer packet and a second physical layer packet from respective radios in accordance with a schedule received from a gateway that identifies the time slot, the first frequency channel and the second frequency channel for reception of the first signal and second signal.

19. The method of claim 16, wherein the first frequency channel and second frequency channel each define non-overlapping ranges of frequencies.

20. The method of claim 16, wherein receiving in parallel (i) the first signal via a first frequency channel and first antenna of the device and (ii) the second signal via a second frequency channel and second antenna comprises applying a notch filter to the first signal to reject frequencies associated with the second signal that interfere with the first signal and applying a notch filter to the second signal to reject frequencies associated with the first signal that interfere with the second signal.

* * * * *